US007265970B2

(12) United States Patent
Jordan

(10) Patent No.: US 7,265,970 B2
(45) Date of Patent: Sep. 4, 2007

(54) APPARATUS

(75) Inventor: Keith Jordan, Dublin (IE)

(73) Assignee: Adwalker (IP) Limited, Dublin (IE)

( * ) Notice: Subject to any disclaimer, the term of this patent is extended or adjusted under 35 U.S.C. 154(b) by 273 days.

(21) Appl. No.: 10/953,547

(22) Filed: Sep. 30, 2004

(65) Prior Publication Data

US 2005/0111174 A1 May 26, 2005

Related U.S. Application Data

(60) Provisional application No. 60/598,898, filed on Aug. 5, 2004.

(30) Foreign Application Priority Data

Oct. 1, 2003 (IE) ................................ 2003/0719

(51) Int. Cl.
*G06F 1/16* (2006.01)

(52) U.S. Cl. ........................................................ 361/681

(58) Field of Classification Search ................ 361/681, 361/683
See application file for complete search history.

(56) References Cited

U.S. PATENT DOCUMENTS 4,037,763 A 7/1977 Turchen ........................ 224/5
4,462,525 A 7/1984 Pingleton et al. ........... 224/210
5,416,310 A 5/1995 Little ......................... 235/462
5,572,401 A * 11/1996 Carroll ....................... 361/683
5,632,044 A 5/1997 Sloot ............................ 2/102
5,762,251 A 6/1998 Gleason ...................... 224/635
5,892,445 A 4/1999 Tomich ....................... 340/573
5,912,653 A 6/1999 Fitch ........................... 345/87
D423,761 S 5/2000 Ng et al. ..................... D2/829
6,092,705 A 7/2000 Meritt ........................ 224/275
6,097,448 A 8/2000 Perkins ....................... 348/837
6,108,197 A 8/2000 Janik .......................... 361/683

(Continued)

FOREIGN PATENT DOCUMENTS

CA 2376374 8/2003

(Continued)

OTHER PUBLICATIONS

Patent Abstracts of Japan, vol. 2000, No. 13, Feb. 5, 2001 & JP2000298445A (Maeda Mitsumasa), Oct. 24, 2000.

(Continued)

*Primary Examiner*—Yean-Hsi Chang
(74) *Attorney, Agent, or Firm*—Jacobson Holman PLLC

(57) ABSTRACT

An apparatus (1) for supporting a mobile electronic display system. The mobile electronic display system includes a display element (11) and a power source (12). In use a wearable computer (4) controls operation of the display element (11). The apparatus (1) comprises a relatively rigid support frame (8), a relatively soft cushion member (9), and a cover (10) for the support frame (8). The support frame (8) is suitable for being worn by a person to support the mobile electronic display system. The support frame (8) comprises a front support frame part (13) located at the front of the wearer, a rear support frame part (14) located at the rear of the wearer, a first bearing member (15) extending over a first shoulder of the wearer, and a second bearing member (16) extending over a second shoulder of the wearer.

42 Claims, 20 Drawing Sheets

U.S. PATENT DOCUMENTS

| | | | | |
|---|---|---|---|---|
| 6,157,533 | A | 12/2000 | Sallam et al. | 361/683 |
| 6,216,927 | B1 | 4/2001 | Meritt | 224/275 |
| 6,334,687 | B1 | 1/2002 | Chino et al. | 353/79 |
| 6,351,388 | B1 | 2/2002 | Jenkins et al. | 361/730 |
| D455,746 | S | 4/2002 | Ronzani et al. | D14/344 |
| 6,377,793 | B1 | 4/2002 | Jenkins | 455/412 |
| 6,393,745 | B1 | 5/2002 | Miki | 40/586 |
| 6,457,024 | B1 | 9/2002 | Felsentein | 707/501 |
| 6,480,713 | B2 | 11/2002 | Jenkins | 455/412 |
| 6,507,486 | B2 | 1/2003 | Peterson, III | 361/683 |
| 6,529,372 | B1 | 3/2003 | Ng et al. | 361/683 |
| 6,532,482 | B1 | 3/2003 | Toyosato | 708/131 |
| 6,552,899 | B2 | 4/2003 | Ronzani et al. | 361/687 |
| 6,650,305 | B1 | 11/2003 | Havey et al. | 345/8 |
| 6,711,414 | B1 | 3/2004 | Lightman et al. | 455/517 |
| 6,725,282 | B1 | 4/2004 | Grzybowski et al. | 710/2 |
| 6,757,719 | B1 | 6/2004 | Lightman et al. | 709/219 |
| D498,218 | S | 11/2004 | Langlois | D14/129 |
| 6,843,012 | B1 | 1/2005 | Dodd | 40/586 |
| 2001/0043164 | A1 | 11/2001 | Thagard et al. | 345/7 |
| 2003/0231166 | A1 | 12/2003 | Langlois | 345/169 |

FOREIGN PATENT DOCUMENTS

| | | | | |
|---|---|---|---|---|
| DE | 4408951 | | | 9/1994 |
| GB | 445158 | | | 4/1936 |
| GB | 2387472 | A | * | 7/2003 |
| GB | 2387472 | | | 10/2003 |
| JP | 6-223306 | | | 1/1987 |
| JP | 2000298445 | | | 10/2000 |
| JP | 2000357025 | | | 12/2000 |
| JP | WO03/028496 | | | 4/2003 |
| WO | WO00/03377 | | | 1/2000 |
| WO | WO01/67221 | | | 9/2001 |
| WO | WO 03/028496 | | * | 4/2003 |
| WO | WO03/079319 | | | 9/2003 |

OTHER PUBLICATIONS

Patent Abstracts of Japan, vol. 2003, No. 4, Apr. 2, 2003 & JP2002373167A (Matsushita Electric Ind Co Ltd), Dec. 26, 2002.

* cited by examiner

APPARATUS

This is a complete application claiming benefit of provisional Ser. No. 60/598,898 filed Aug. 5, 2004.

INTRODUCTION

This invention relates to an apparatus for supporting a mobile electronic display system.

Advertising is a huge industry in which large amounts of money are often spent on various advertising media to convey a desired message. However even the most expensive and sophisticated advertising campaigns generally rely on display of information in a "broad brush" manner.

This invention is aimed at providing an apparatus which enables more targeted and meaningful advertising to be achieved.

STATEMENTS OF THE INVENTION

According to the invention, there is provided an apparatus for supporting a mobile electronic display system, the apparatus comprising a support frame suitable for being worn by a person to support a mobile electronic display system, the support frame comprising a front support frame part configured to be located at the front of a person wearing the support frame, and a rear support frame part configured to be located at the rear of a person wearing the support frame. The front and rear parts of the support frame assist in distributing the weight of the display system for greater comfort of the wearer. In particular the weight of the support frame parts and/or the mobile electronic display system will not tend to cause the wearer to lose balance and fall forwards or backwards.

Because the support frame is worn by the person, this ensures that the display system has a high degree of mobility. By using the display system to conduct an advertising campaign, the apparatus of the invention enables highly focused advertising to be achieved.

In one embodiment the support frame is configured to support a computer controlled display element. Preferably the support frame is configured to support a wearable computer controlled display element. Ideally the support frame is configured to support a display element facing substantially away from a person wearing the support frame.

In one case the front support fame part extends substantially across the chest of a person wearing the support frame. In another case the rear support frame part extends substantially across the back of a person wearing the support frame. Preferably the front and/or rear support frame part is located below the head of the person wearing the support frame. By arranging the support frame close around the torso of the wearer, this enhances the stability and comfort of the support frame. In particular the possibility of the wearer losing balance or being knocked over, for example due to a gust of wind is minimized. This aspect of the invention is further improved due to the fact that the support frame parts are below the wearer's head.

The support frame may comprise at least one bearing member configured to extend over a shoulder of a person wearing the support frame between the front support frame part and the rear support frame part. Preferably the support frame comprises a first bearing member configured to extend over a first shoulder and a second bearing member configured to extend over a second shoulder of a person wearing the support frame. The bearing members bear against the shoulders of the wearer to transfer the load of the display system to the wearer. Most preferably the front support frame part and the rear support frame part are supported by the at least one bearing member. The support frame may be substantially "U"-shaped in side-view. Ideally the front support frame part and the rear support frame part hang from the at least one bearing member.

Preferably the front support frame part is substantially fixed relative to the rear support frame part. Ideally the support frame is substantially rigid.

In another embodiment the support frame comprises a display holder for releasably holding a display element of a mobile electronic display system. Advertising campaigns may be effectively conducted using the display element. Conveniently the display element may be removed from the display holder for repair and/or replacement. Ideally the display holder comprises a first holder part detachably coupled to a second holder part. The display holder may define a reception space between the first holder part and the second holder part for removably receiving a display element. Most preferably the display holder comprises a window for displaying a display element held in the display holder. The window is preferably configured to face substantially away from a person wearing the support frame. In one case the front support frame part comprises the display holder.

In one embodiment the support frame comprises a power source holder for holding a power source of a mobile electronic display system. The power source holder may be used to safely and securely hold a power source. This is especially important when the required power source is bulky and/or heavy, for example to provide power for a relatively large advertising display element. Preferably the power source holder is configured to releasably hold a power source. Conveniently the power source may be removed from the power source holder for repair and/or replacement and/or recharging. Ideally the power source holder comprises a first holder part movably coupled to a second holder part. The first holder part may be movable relative to the second holder part between a holding configuration and a replacing configuration. Most preferably the first holder part is hingeable relative to the second holder part between the holding configuration and the replacing configuration. In the holding configuration the power source holder preferably defines a reception space between the first holder part and the second holder part for removably receiving a power source. The rear support frame part may comprise the power source holder.

In another preferred embodiment the apparatus comprises a support element protruding from the support frame inwardly towards a person wearing the support frame to engage against the person. The support element assists in distributing the weight of the wearable computer for greater comfort of the wearer. Ideally the support element is supported by the rear support frame part. The support element may be configured to engage support against the lower spine of a person wearing the support frame. Most preferably the support element comprises a lumbar support element. Ideally the support element is substantially "D"-shaped in cross-section.

In one case the apparatus comprises at least one urging member to urge the support element into engagement against a person wearing the support frame. By urging the support element towards engagement against the wearer, the wearer can adjust the support element to maximize comfort. The urging member may comprise a tensionable member for pulling the support element into engagement against a person wearing the support frame. Preferably the tensionable member extends between the front support frame part and the rear support frame part. Ideally the tensionable member is configured to extend along a side of a person wearing the support frame. Most preferably the apparatus comprises a first tensionable member configured to extend along a first side and a second tensionable member configured to extend along a second side of a person wearing the support frame. The tensionable member may comprise a release element to facilitate release of tension in the tensionable member. The release element preferably comprises a clip.

In a further embodiment the apparatus comprises a cushion member extending over at least part of a surface of the support frame. The cushion member provides a further means of enhancing the comfort of the wearer. The support frame may comprise an inner surface configured to face substantially towards a person wearing the support frame, and the cushion member may extend over the inner surface. The support frame may comprise an outer surface configured to face substantially away from a person wearing the support frame, and the cushion member may extend over at least part of the outer surface. Preferably the cushion member at least partially encloses the support frame. Ideally the cushion member comprises a foam. The cushion member may comprise the support element.

In another case the apparatus comprises a cover for the support frame. The cover may enclose the support frame. Preferably the cover comprises one or more openings to facilitate access to one or more components of a mobile electronic display system beneath the cover. Ideally the opening is selectively closeable. The cover may comprise a flap for extending over the opening to selectively close the opening. Most preferably the cover comprises one or more windows for displaying one or more components of a mobile electronic display system beneath the cover. The windows in the cover enable an advertising display element beneath the cover to be viewed. The windows also enable the functioning of components beneath the cover to be monitored, such as a power indicator LED on a battery.

The cover may comprise a breathable material. The cover may comprise a water-resistant material.

The invention also provides in another aspect a mobile display comprising an apparatus of the invention and an electronic display system.

In one embodiment the electronic display system comprises a display element. The display element may comprise a computer controlled display element. Ideally the apparatus comprises a wearable computer controlled display element. In one case the display element comprises a screen for displaying a visual image. The screen is preferably daylight-viewable. The daylight-viewable screen enables the display element to be used day and night. Ideally the screen brightness output is at least 1000 nits, and most preferably approximately 1500 nits.

The width of the display element is preferably at least 20 cm, ideally at least 25 cm, and most preferably approximately 30 cm.

The height of the display element is preferably at least 15 cm, and ideally approximately 20 cm.

The display element may comprise a tablet personal computer.

In one case the electronic display system comprises a power source. The power source may comprise a battery.

The display may comprise a source of visual images, such as a DVD player.

The display may comprise a wearable computer for controlling the electronic display system. In one embodiment the wearable computer is configured to facilitate wireless communication between the wearable computer and a communications device remote from the wearable computer. The wireless communication between the wearable computer and the remote device enables the advertising campaign being conducted by the wearable computer to be rapidly updated, for example in response to feedback received.

The display may comprise a belt for supporting the wearable computer, the belt being suitable to be worn by a person wearing the support frame.

In another case the display comprises a user interface for information input/output between a user and a wearable computer.

The user interface may comprise a printing device. The user interface may comprise a scanning device. The user interface may comprise an audio recording device. The user interface may comprise an audio transmitting device. The user interface may comprise a touch screen interface. Preferably the display comprises a belt for supporting the user interface, the belt being suitable to be worn by a person wearing the support frame.

In a further aspect, the invention provides a garment suitable for being worn by a person supporting a wearable computer, the garment comprising an accommodating part for accommodating at least one component part of the wearable computer.

The accommodating part may comprise an opening through the garment. Preferably the opening is provided adjacent an end of the garment. Ideally the opening is provided in the form of a cut-away section of the garment.

The accommodating part may be provided at a side of the garment. In one case the garment comprises a first accommodating part at a first side of the garment and a second accommodating part at a second side of the garment. Most preferably the accommodating part is configured to be located substantially at a hip of a person wearing the garment.

The garment may comprise at least one holder. Preferably the holder comprises a pocket.

In a further aspect, the invention provides a mobile display comprising:- an electronic display element;

an apparatus suitable for being worn by a person to support the display element;

the display element being movable relative to the apparatus between a display configuration and an interface configuration.

In one embodiment the display element is hingeable between the display configuration and the interface configuration.

In a preferred case the system comprises a user interface for information input/output between a user and the display element. Ideally the user interface is accessible in the interface configuration. Most preferably the user interface is inaccessible in the display configuration. The support element may have a front side for displaying and a rear side, and the user interface may be provided at the rear side of the display element.

In another case in the display configuration, the display element is substantially parallel to a wearer. Preferably in the display configuration, the front side of the display element faces substantially away from a wearer. In another case in the interface configuration, the display element is substantially perpendicular to a wearer. Preferably in the interface configuration, the rear side of the display element faces substantially towards the head of a wearer.

In another aspect, the invention provides a wearable member for supporting a display element, the wearable member being suitable to be worn by a person to support a display element facing substantially away from the person wearing the wearable member.

In one embodiment the wearable member is configured to support a computer controlled display element. Ideally the wearable member is configured to support a wearable computer controlled display element.

BRIEF DESCRIPTION OF THE DRAWINGS

The invention will be more clearly understood from the following description of some embodiments thereof, given by way of example only, with reference to the accompanying drawings, in which:-

FIG. 8(*a*) is a perspective view from the front of a person wearing the apparatus of FIG. 1;

FIG. 8(*b*) is a perspective view from the rear of a person wearing the apparatus of FIG. 1;

FIG. 8(*c*) is a front view of a garment according to the invention;

FIG. 8(*d*) is a perspective view from the front of a person wearing the garment of FIG. 8(*c*);

FIG. 8(*e*) is a perspective view from the front of a person wearing the garment of FIG. 8(*c*) and the apparatus of FIG. 1;

FIG. 8(*f*) is a perspective view from the rear of a person wearing the garment of FIG. 8(*c*) and the apparatus of FIG. 1;

DETAILED DESCRIPTION

Figure 1:
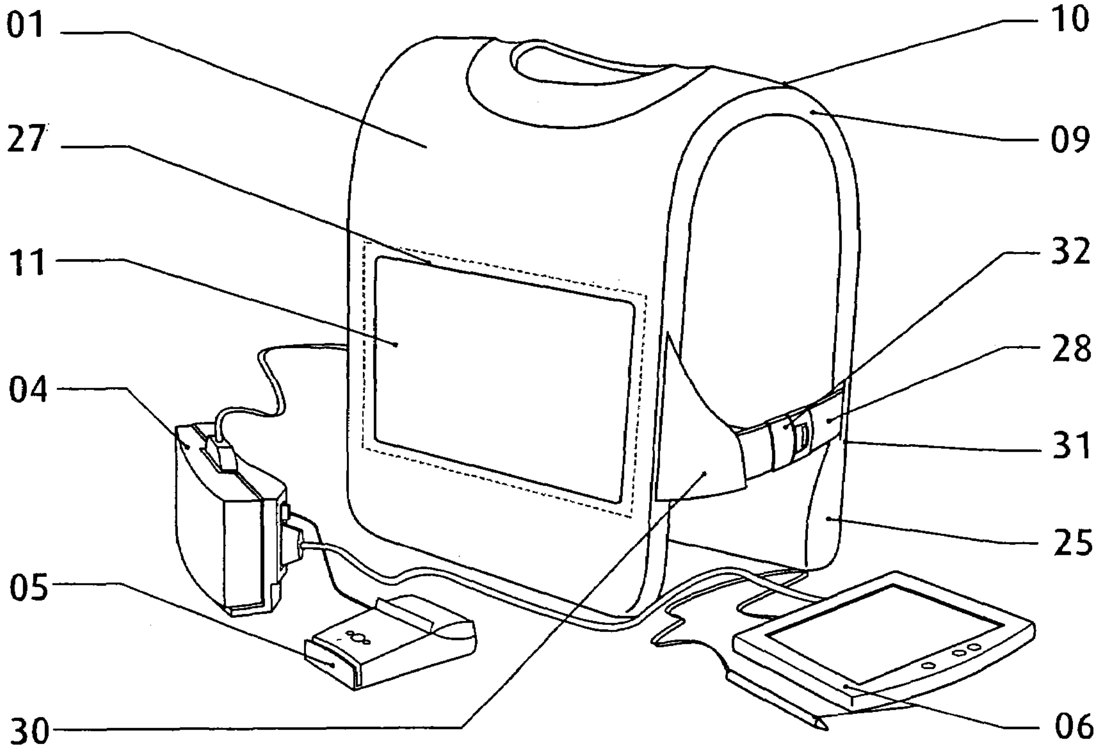
FIG. 1 is a perspective view from the front of an apparatus for supporting a mobile electronic display system according to the invention.

Referring to the drawings, and initially to FIG. 1 thereof, there is illustrated an apparatus 1 according to the invention for supporting a mobile electronic display system. In this case the mobile electronic display system includes a display element 11 and a power source 12. In use a wearable computer 4 controls operation of the display element 11.

The apparatus 1 comprises a relatively rigid support frame 8, a relatively soft cushion member 9, and a cover 10 for the support frame 8.

Figure 4:
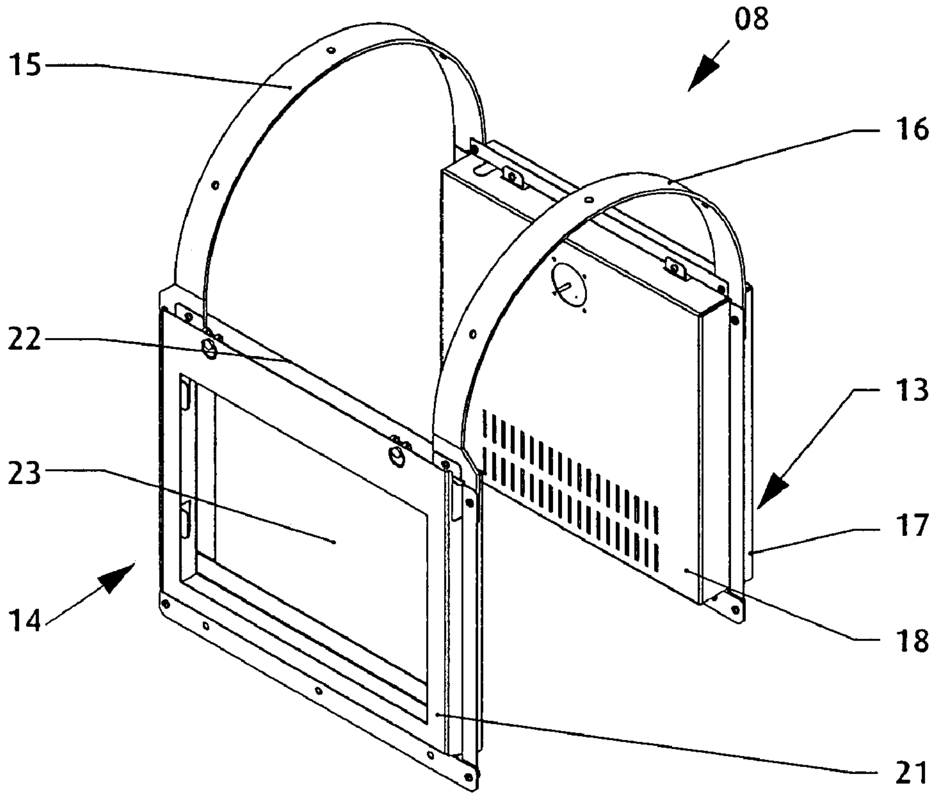
FIG. 4 is a perspective view from the rear of a support frame of the apparatus of FIG. 1.
Figure 5:
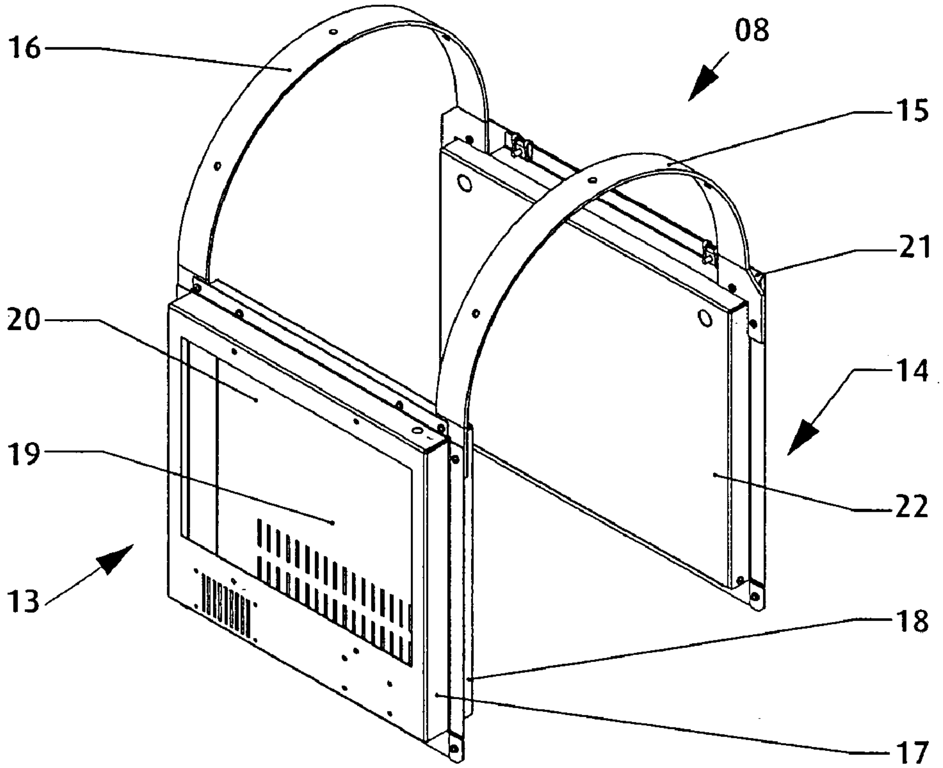
FIG. 5 is a perspective view from the front of the support frame of FIG. 4.
Figure 6:
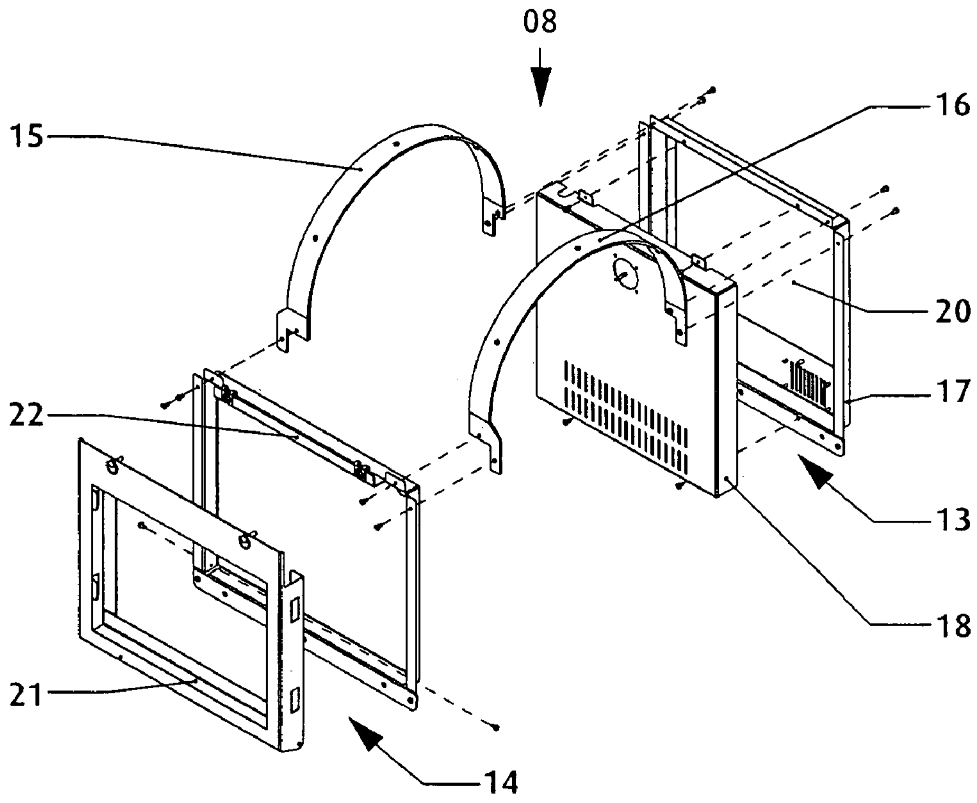
FIG. 6 is an exploded, perspective view from the rear of the support frame of FIG. 4.
Figure 7:
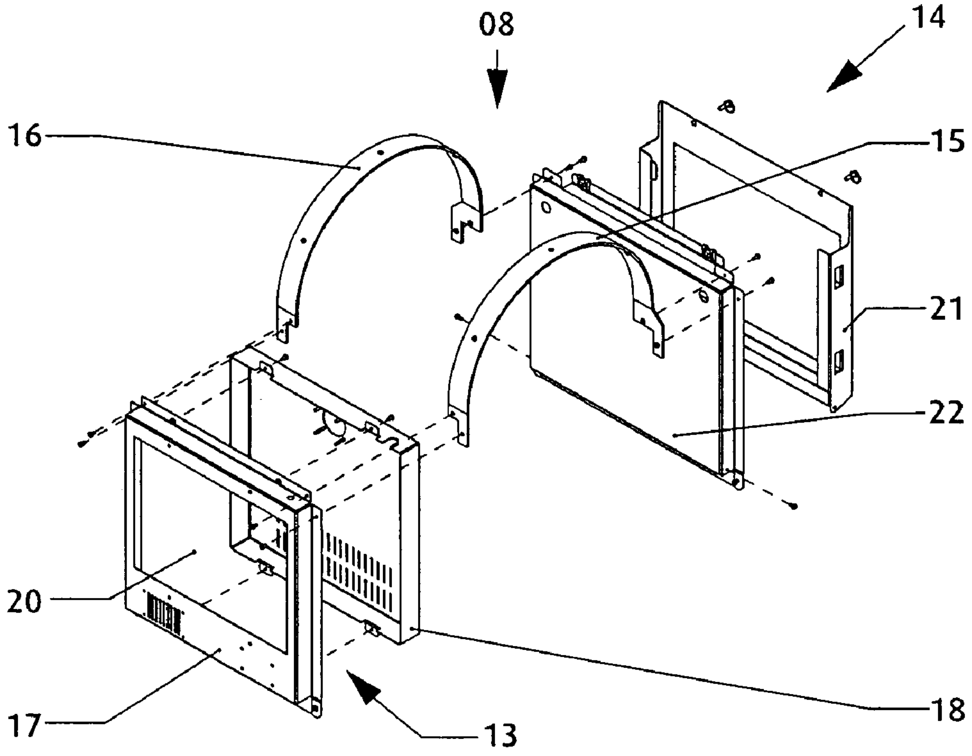
FIG. 7 is an exploded, perspective view from the front of the support frame of FIG. 5.

The support frame 8 is suitable for being worn by a person to support the mobile electronic display system. As illustrated in FIGS. 4 to 8, the support frame 8 comprises a front support frame part 13 configured to be located at the front of the wearer, a rear support frame part 14 configured to be located at the rear of the wearer, a first bearing member 15 configured to extend over a first shoulder of the wearer, and a second bearing member 16 configured to extend over a second shoulder of the wearer. The front support frame part 13 extends substantially across the chest of the wearer, and the rear support frame part 14 extends substantially across the back of the wearer. Each bearing member 15, 16 extends from the front part 13 to the rear part 14 in a semi-circular shape. Both the front support frame part 13 and the rear support frame part 14 are located beneath the wearer's head. Overall, the apparatus 1 has the configuration of a sleeveless vest, and the support frame 8 is substantially "U"-shaped in side-view, as illustrated in FIGS. 4 and 5.

One end of each bearing member 15, 16 is fixedly attached to the front part 13 and the other end of each bearing member 15, 16 is fixedly attached to the rear part 14. In this manner, the front part 13 and the rear part 14 are supported by the bearing members 15, 16. In particular the front and rear support frame parts 13, 14 hang from the two bearing members 15, 16.

The rigid support frame 8 maintains the position of the front support frame part 13 fixed relative to the position of the rear support frame part 14. This results in a more stable and comfortable to wear arrangement. The support frame 8 thus assists in better weight distribution and a more ergonomically suited arrangement. The support frame 8 was especially designed to achieve this technical effect following extensive anthropometric assessment.

Figure 8:
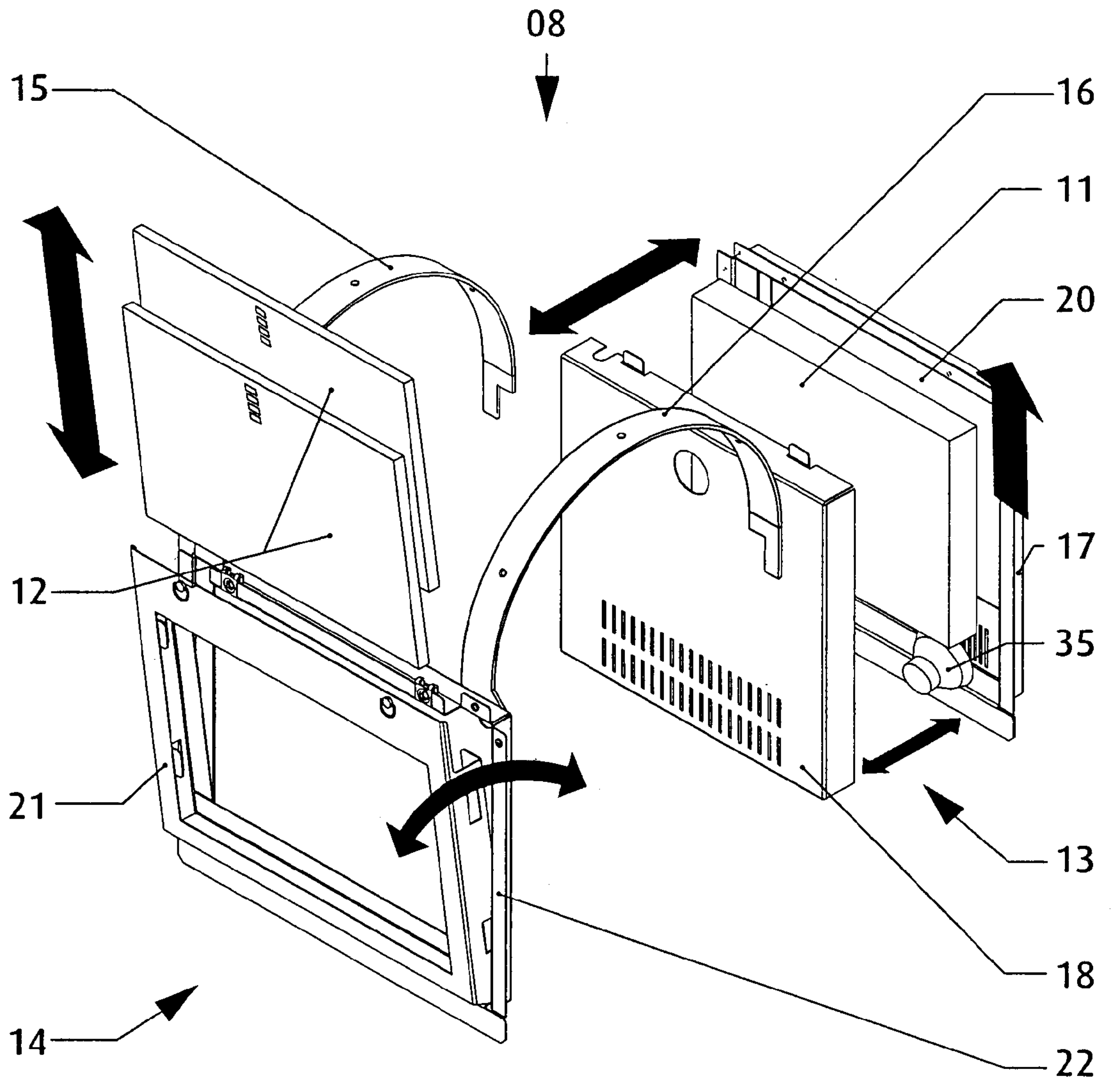
FIG. 8 is an exploded, perspective view from the rear of the support frame of FIG. 4, in use.
Figure 8A:
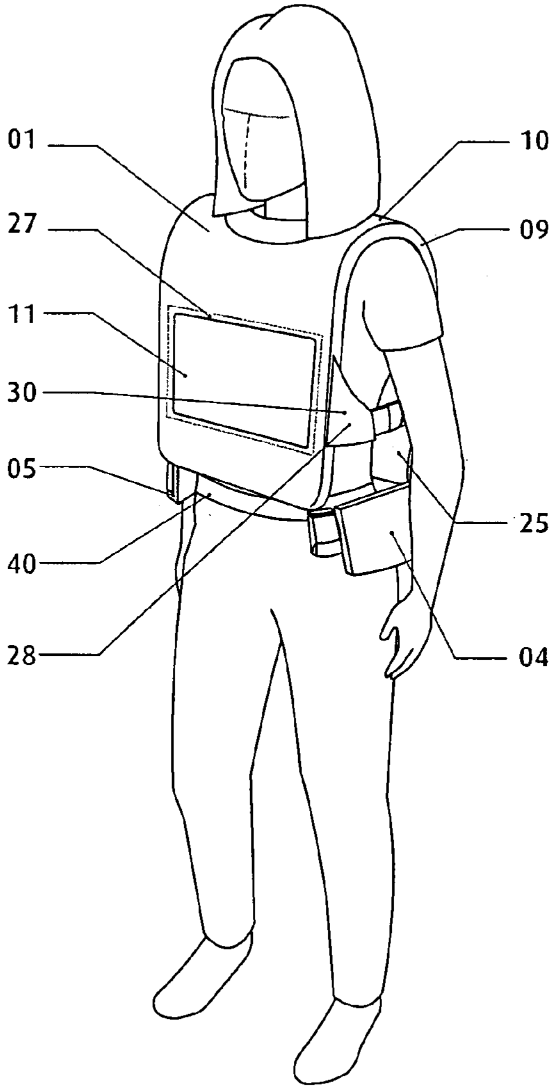
Figure 8B:
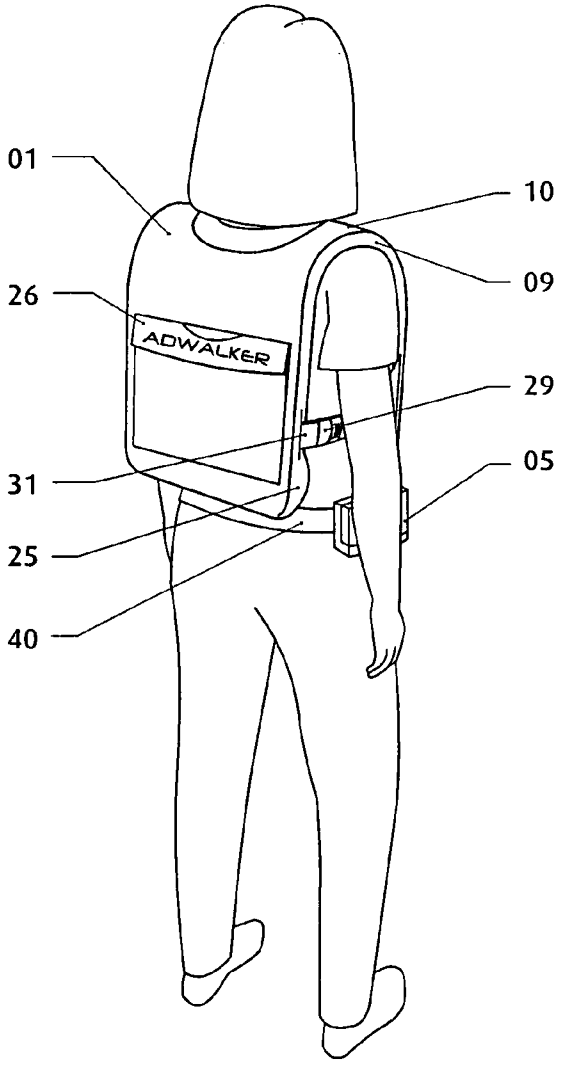
Figure 8C:
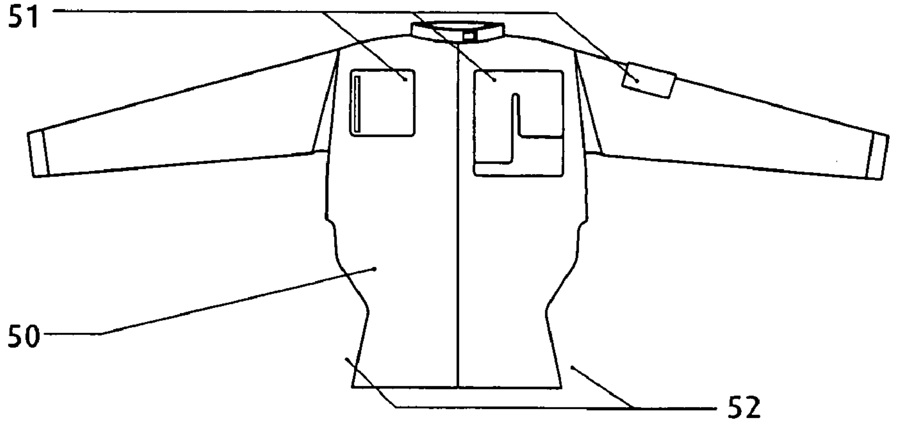
Figure 8D:
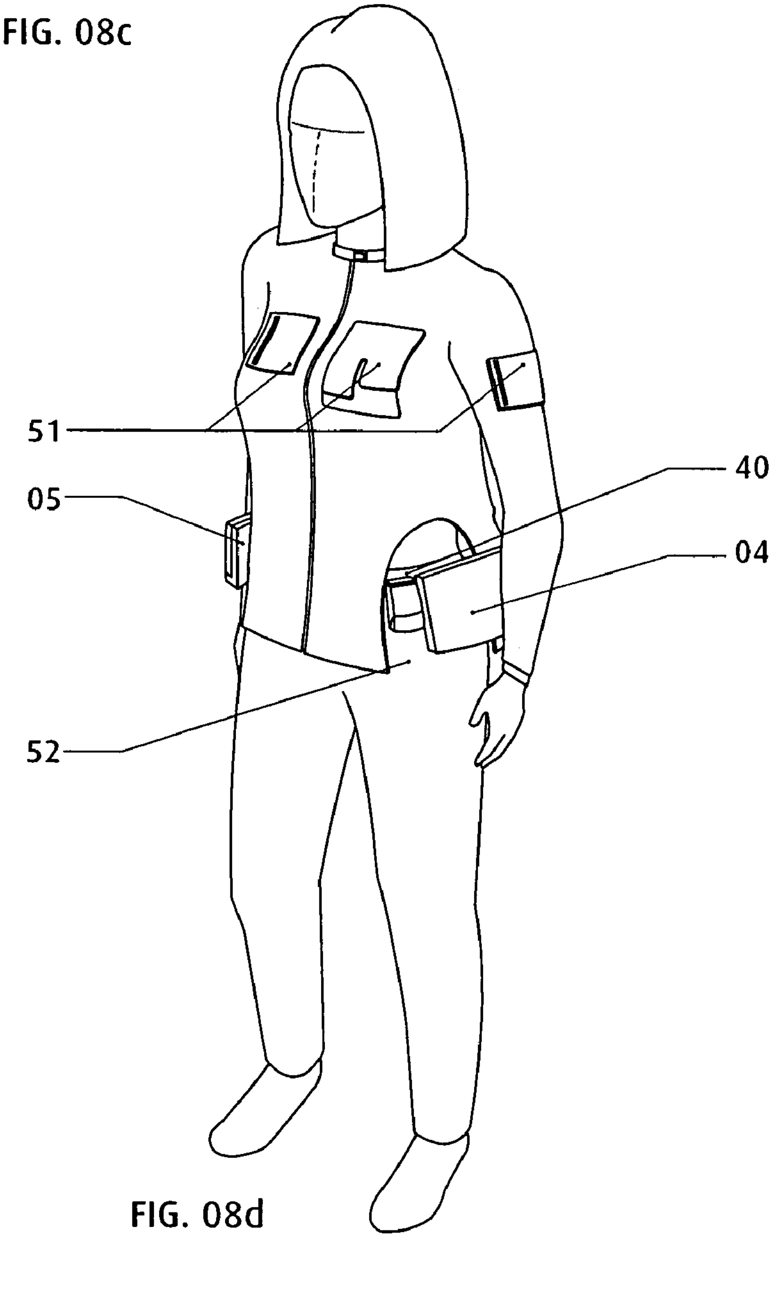
Figure 8E:
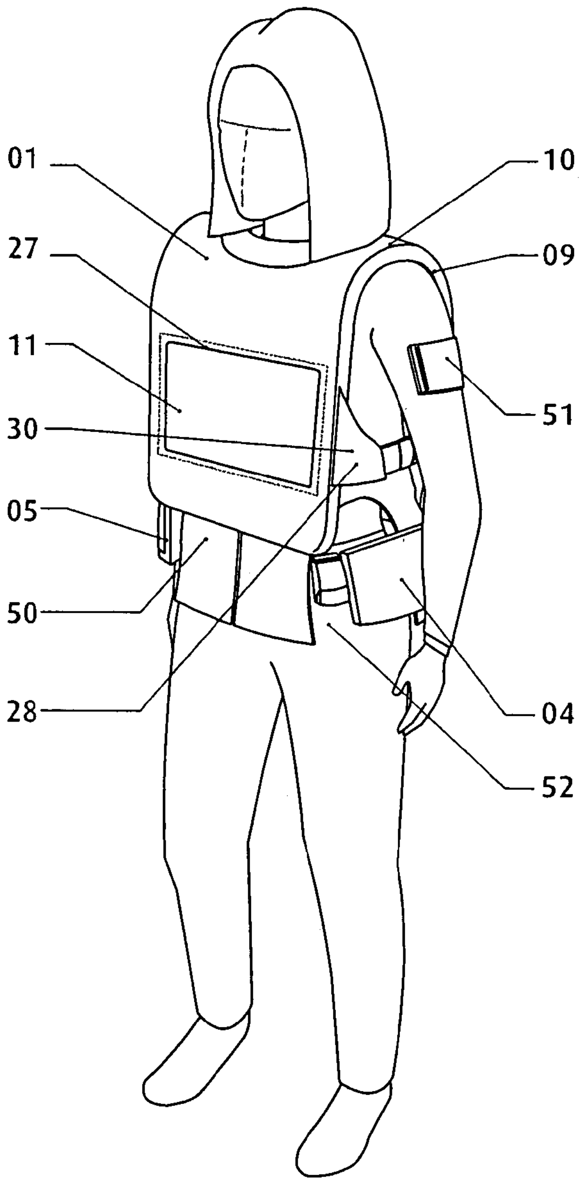
Figure 8F:
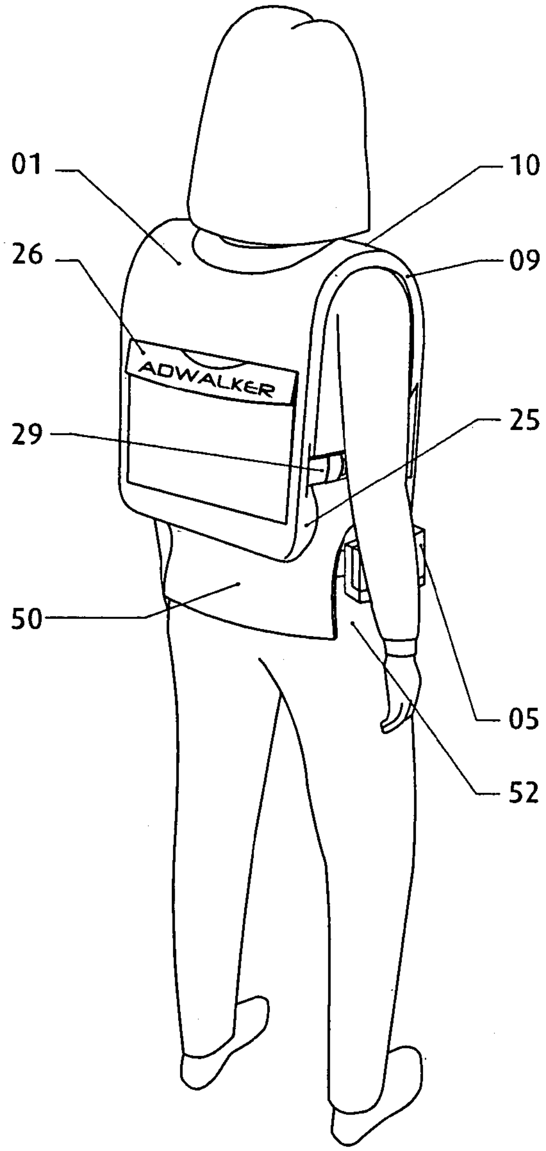

The front part 13 provides a display holder for holding the display element 11. In particular the front part 13 comprises a first holder part 17 and a second holder part 18, which are detachably coupled together. When the holder parts 17, 18 are coupled together, the front part 13 defines a reception space 19 between the holder parts 17, 18 for securely holding the display element 11. When the holder parts 17, 18 are detached from one another, the display element 11 may be removed, as illustrated in FIG. 8.

The front part 13 comprises a window 20 for displaying the display element 11 when the display element 11 is held in the reception space 19. The window 20 faces away from the wearer when the support frame 8 is being worn. In this manner the support frame 8 supports the display element 11 facing substantially away from the wearer and so maximizes the visibility of the display element 11 to people that the wearer passes by, or that pass the wearer by.

The rear part 14 provides a power source holder for holding the power source 12. In particular the rear part 14 comprises a first holder part 21 and a second holder part 22, which are coupled together and are hingeably movable relative to one another between a holding configuration (FIG. 4) and a replacing configuration (FIG. 8). In the holding configuration, the rear part 14 defines a reception space 23 between the holder parts 21, 22 for securely holding the power source 12. In the replacing configuration, the power source 12 may be removed from the rear part 14, as illustrated in FIG. 8.

In this case the front part 13, the rear part 14 and the two bearing members 15, 16 are provided in the form of aluminum sheet metal.

The cushion member 9 encloses the support frame 8. In particular the cushion member 9 extends over the full inner surface of the support frame 8 which faces towards the wearer, and over the full outer surface of the support frame 8 which faces away from the wearer. The cushion member 9 comprises a foam, in this polyurethane, and has a thickness of 25 mm around most of the support frame 8.

Towards the base of the rear part 14, the cushion member 9 comprises a lumbar support element 25 which protrudes from the support frame 8 inwardly towards the wearer. The lumbar support element 25 is substantially "D"-shaped in cross-section. In use, the lumbar support element 25 engages against the lower spine of the wearer. The cover 10 encloses both the cushion member 9 and the support frame 8. The cover 10 is provided in the form of a breathable and water-resistant fabric. In this case the cover 10 comprises the material Cordura.

The cover 10 comprises two straps 28, 29 extending between a front part 30 of the cover 10 and a rear part 31 of the cover 10. Each strap 28, 29 is configured to extend along a side of the wearer inside of an arm of the wearer.

The straps 28, 29 may be used as tensioning means to urge the lumbar support element 25 into engagement with the wearer's lower spine by effectively pulling the front part 30 and the rear part 31 closer together.

A clip 32 is provided along each strap 28, 29 to facilitate release of tension in the strap 28, 29.

Figure 3:
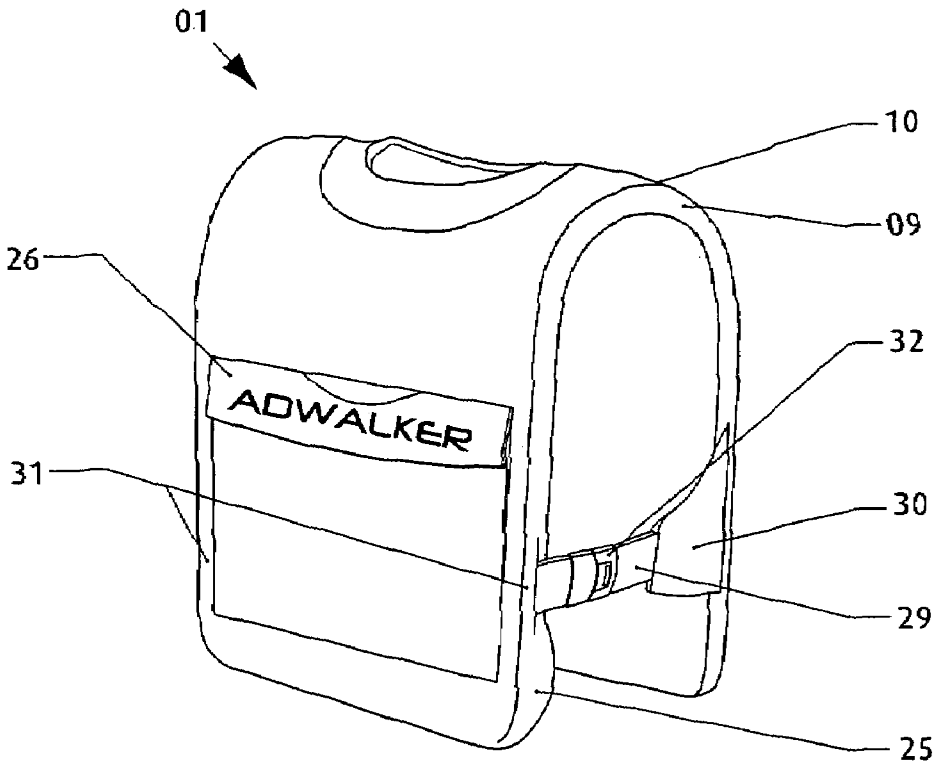
FIG. 3 is a perspective view from the rear of the apparatus of FIG. 1.

An opening is provided through the cover 10 in the rear part 31 of the cover 10 to facilitate access to the power source 12 in the rear part 14 of the support frame 8 beneath the cover 10. A flap 26 is provided for extending over the opening to selectively close the opening (FIG. 3).

The cover 10 also comprises a front window 27 to enable the display element 11 beneath the cover 10 to be displayed through the cover 10, and a rear window to enable a power indicator LED on the power source 12 beneath the cover 10 to be displayed through the cover 10.

In this case, the display element 11 is provided in the form of a daylight-viewable, electronic flat-panel screen for displaying a visual image. The screen 11 is controlled by the wearable computer 4. The screen preferably has a brightness output of at least 1000 nits, and in this case preferably 1500 nits.

The screen 11 preferably has a width of at least 20 cm, most preferably at least 25 cm, and ideally 30 cm. The screen 11 preferably has a height of 15 cm, and ideally 20 cm. In this manner the screen 11 is more easily visible to people that the wearer of the apparatus 1 passes by, to maximize communication between the screen 11 and the people passed by the wearer.

The screen 11 is supported in the front part 13 of the support frame 8 in a manner that allows assisted air flow behind it for cooling via vent holes.

Figure 2:
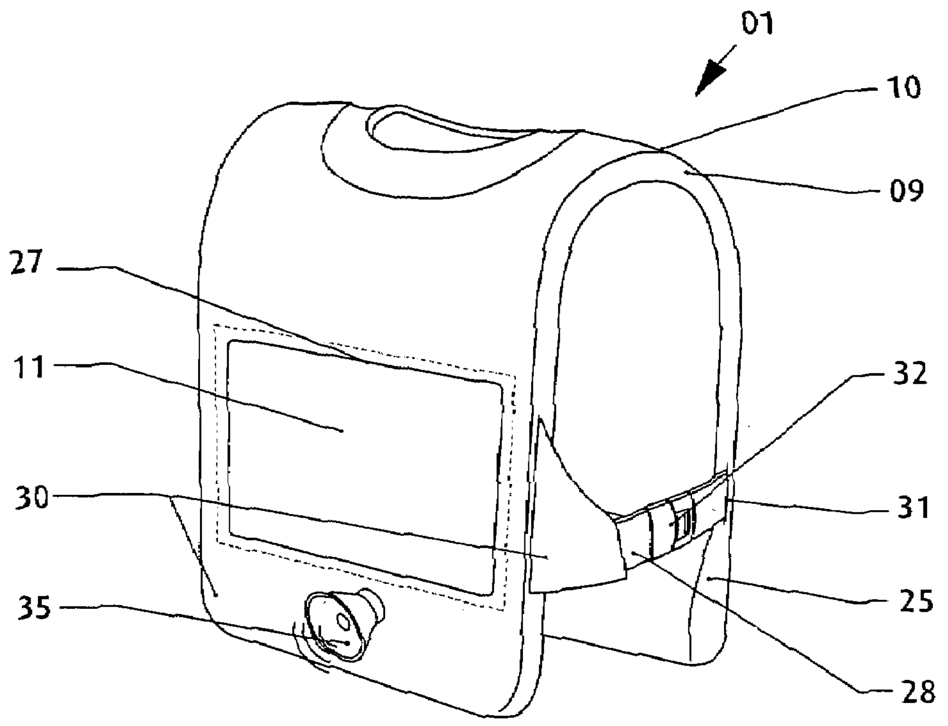
FIG. 2 is a perspective view from the front of the apparatus of FIG. 1.

The power source 12 is provided, in this case, in the form of a high-output battery. The apparatus 1 is suitable for use with a variety of wearable computers. In the case of the wearable computer 4, wireless communication is possible between the wearable computer 4 and a communications device remote from the wearable computer 4. The support frame 8 may support an antenna for wireless communication at the rear. Information input/output between a user and the wearable computer 4 may be achieved using a variety of user interface means. For example a printing device 5 may be employed to print tickets or coupons (FIG. 1), a scanning device 5 may be employed to scan a credit card to effect payment for a service being advertised by the wearable computer 4 (FIG. 1), a touch screen interface 6 may be employed (FIG. 1), an audio recording/transmitting device 35 may be employed (FIG. 2).

Together the apparatus 1, the display element 11, the power source 12, the wearable computer 4 and the user interface means 5, 6, 35 provide a mobile display suitable for being worn by a person. The wearable computer 4 and the interface means 5, 6, 35 may be supported on a belt 40 worn by the person wearing the apparatus 1, as illustrated in FIGS. 8(*a*) and 8(*b*).

The wearable computer 4 allows information input in various modes, including touch-screen technology on the screen 11, and handwriting recognition on the pad 6. Speakers 35 can be incorporated in the chassis and used to output music or any desired sound. Also the apparatus can record video footage. Any data captured can be stored locally, and it can be communicated via wireless networks with other fixed or wireless computing devices. This allows it, for example, to convey information about its surroundings. The visual and/or sound content can be from DVD or video, or software for location-specific demonstrations. For example a location-specific download may relate to a retail premises where the apparatus 1 is located.

The user interface means may be connected to the wearable computer 4 using any suitable connecting means, such as USB cables.

The person wearing the apparatus 1 and the belt 40 may be dressed in any suitable clothing. However one particularly suitable garment 50 according to the invention is illustrated in FIGS. 8(*c*) to 8(*f*).

The garment 50 comprises cut-away, open sections 52 at each side of the garment 50 at the lower end of the garment 50. In use the cut-away sections 52 are located substantially at a hip of the wearer (FIG. 8(*d*)). In this manner each cut-away section 52 provides an accommodating part to accommodate the wearable computer 4 and the various user interface means 5, 6, 35 supported on the belt 40 in a comfortable and ergonomic arrangement, as illustrated in FIGS. 8(*d*) to 8(*f*).

The garment 50 also includes a number of pockets 51 for holding other component parts of the wearable computer 4 or the user interface means 5, 6, 55.

For both information and security, the apparatus 1 may be tracked, and it may be remotely updated with content or software. Information can be captured locally for polling/surveys, and it can transmit results dynamically.

Figure 9:
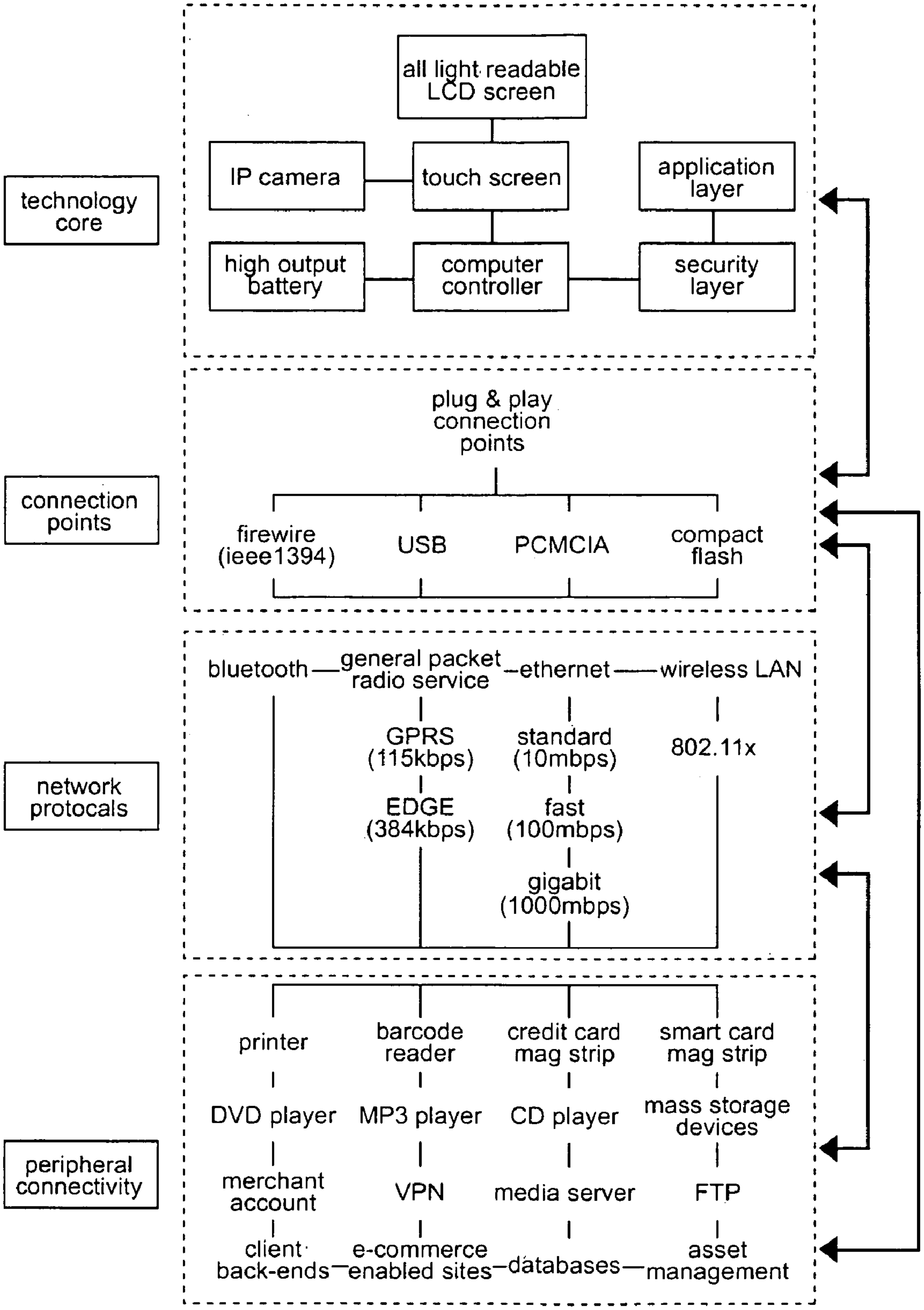
FIG. 9 is a block diagram illustrating the architecture of the technology core, the connectivity points, the network protocols and the peripheral connectivity.

The various functions of the wearable computer 4 are shown in more detail in FIG. 9. This architecture allows excellent versatility for both local and remote communication and for configuration of peripherals. As is clear from this block diagram, the wearable computer 4 includes a controller, a security layer, an application layer, the screen 11, and the high-output battery 12. Various "plug-and-play" connection points allow a variety of devices to be connected for input or output or data or contact in a very versatile manner. A range of network protocols also allow excellent versatility for communication, both locally (for example, Bluetooth) and remotely (for example, GPRS). The peripheral connectivity items allow configuration of the wearable computer 4 in a highly versatile manner, as shown in FIG. 9.

In more detail, the apparatus 1 may have an integrated IP camera built into the front (above the screen 11). This allows remote monitoring and interactive two-way video messaging through a wireless network. The camera may be connected through an Ethernet connection integrated into the pack 1. The camera may have a built-in web server and static IP address. Remote pan/tilt operations with web-based viewing are also available. The camera may be outdoor ready and splash resistant for wet weather operation. Images can be transmitted to virtually any Internet Device, including a handheld PC or even on the LCD of an Internet-ready cell phone. The wearable computer 4 may also send these images anywhere in the world when the camera is triggered by a set timer. Clients can view real-time iterations of their campaigns regardless of their location.

The apparatus 1 also enables remote monitoring. The client has the ability to place a secure web address into a web browser and view in real time each individual apparatus 1 in operation regardless of their location. This enables the client to verify the apparatus 1 is operating in the required location, monitor the campaigns as they happen (real-time), make decisions regards copy iterations, e.g. if an offer displayed on the screens 11 is not having the desired result they can order an update broadcast changing the price or text.

Another feature is the ability to integrate call centers into a deployment. The wearable computer 4 uses two-way messaging to further enhance interaction. The user sees the client service representative in the call center on the apparatus screen and the client service representative sees the user on the street. Using an external microphone the user can talk in real time to the representative and request more information on specific offers.

The apparatus 1 may be operated in a wide range of uses, such as the following:

Brand/Product Advertising

The apparatus 1 can distribute broadcast quality messaging. Advertisers can deliver messaging applicable to new product launches, established brands/products, compliment existing 'traditional' media activity and deliver a purchase 'call to action' in the most relevant locations with precise timing. Bespoke advertising and marketing messages may be relayed to the target consumer depending on location, varying target audience, time of the day and seasonality.

Ticketing & On-Demand Customized Printing

The apparatus 1 can provide secure mobile/remote ticketing at street level. A direct thermal printer 5 has rubberized over-moulding to maintain both rugged construction and minimal weight. It supports fonts from 12 to 48 pt and can include optional character sets. Secure bar-code symbologies include Code 39, Code 128, Interleaved 2 of 5, Postnet, UPC-A and UCC/EAN 128. It can create customized customer loyalty cards and secure gift cards on demand or serve customers faster with mobile transaction systems for point-of-sale and returns processing.

Gaming and Competitions

Interactive customized games and competitions may be played, such as "giveaways" and opt-in marketing based competitions. The apparatus 1 has the ability to interact with consumers on multiple levels and provides enhanced entertainment.

Data Capture

Data can be captured and downloaded to a client database. Consumer data can be entered directly by the wearer or by the consumer, and distributed in real-time to clients.

Research

Research can be conducted 'in the field' and monitored in real time through wireless broadcast facilities.

Promotions

A range of promotions can be activated using the apparatus 1. Promotions can be enhanced in conjunction with a traditional media brand campaign or in isolation. The platform can lead to promotional copy being iterated in real time depending on consumer response.

Information Services

Real time information and location specific services (GPS), such as sport and business updates and localized dynamic tourist information can be delivered via a dedicated digital network.

Monitoring/Evaluation

Through the apparatus dedicated digital network, advertisers and marketers can monitor the performance of their campaigns.

Smart Cards/Credit Cards

Smart Card and Credit Card capabilities can be integrated into the apparatus platform in order to facilitate secure financial transactions.

There may also be a screen provided at the back of the support frame 8, thus doubling the area of visual output.

Figure 10:
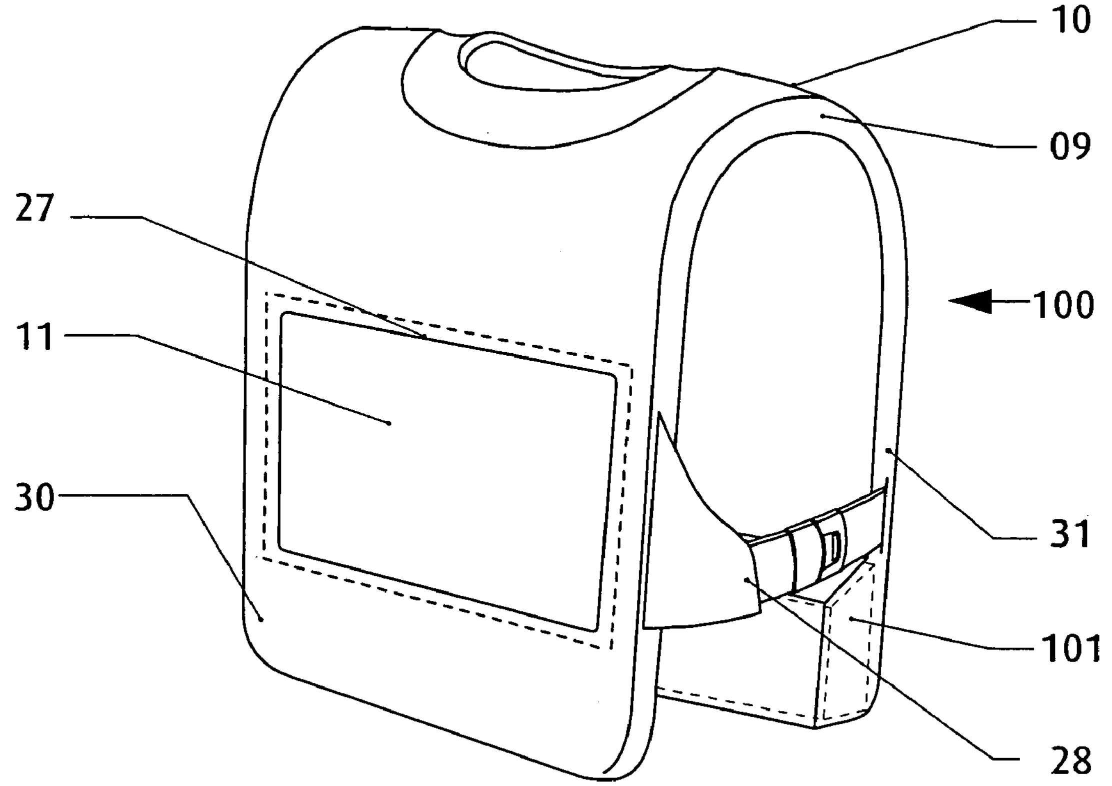
FIGS. 10 and 11 are views similar to FIGS. 2 and 3 of another apparatus for supporting a mobile electronic display system according to the invention.
Figure 11:
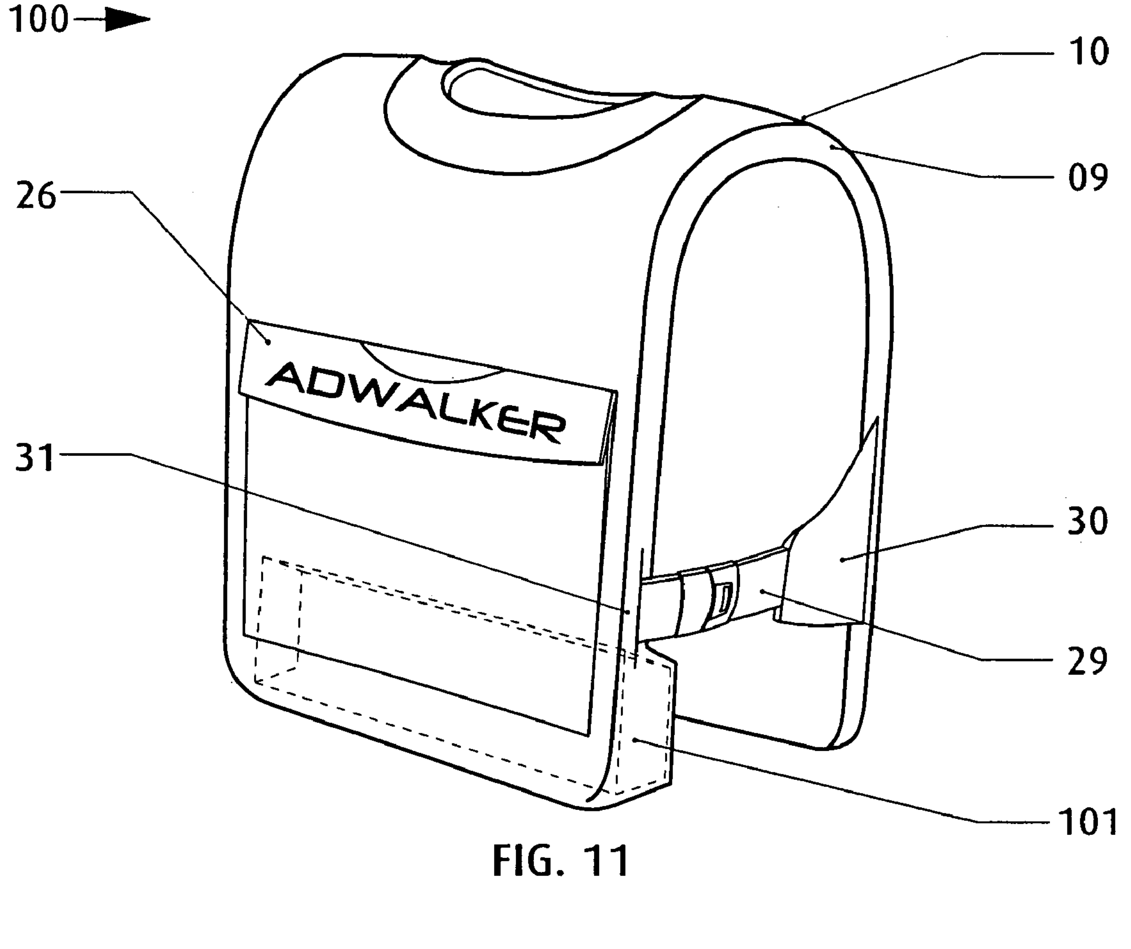

It will be appreciated that the wearable computer 4 may be employed in a variety of possible applications, for example:

Brand and product advertising
Promotions
Interactive messaging (SMS, MMS, Bluetooth)
Research and data mining
Interactive games and competitions
Ticketing
Digital coupons
Financial transactions
Reservations
Interactive demonstrations
Location specific information services
Commercial messaging and advertising
Sales promotion
Public relations
Direct marketing
Direct sales Referring to FIGS. 10 and 11, there is illustrated another apparatus 100 for supporting a mobile electronic display system according to the invention, which is similar to the apparatus 1 of FIGS. 1 to 9, and similar elements in FIGS. 10 and 11 are assigned the same reference numerals.

In this case the lumbar support element 101 is substantially trapezoidal-shaped in cross-section.

It will be appreciated that a variety of possible shapes and/or configurations may be employed for the lumbar support element. For example, the lumbar support element may be square or rectangular shaped in cross-section.

Figure 12:
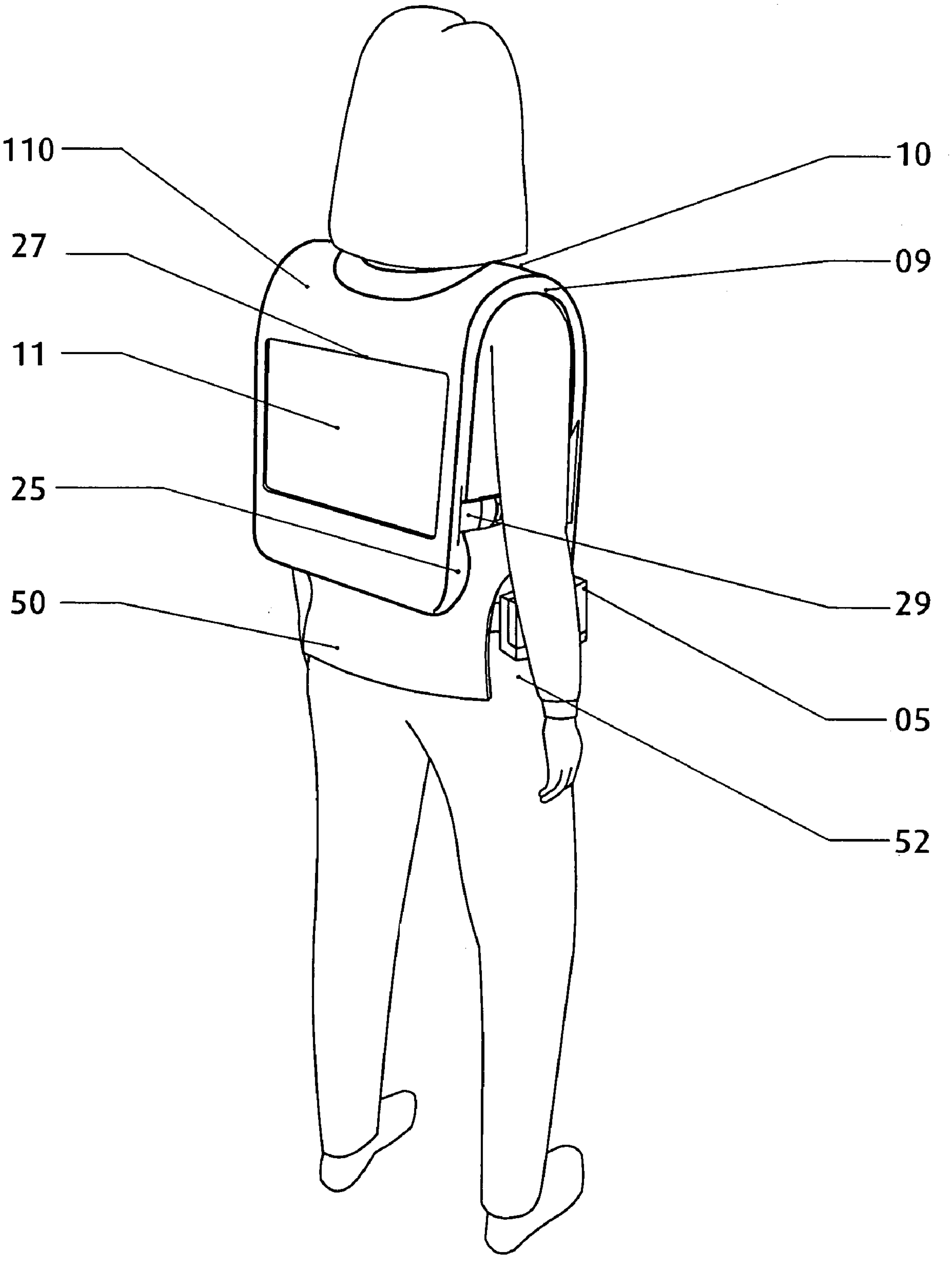
FIG. 12 is a view similar to FIG. 8(*f*) of another apparatus for supporting a mobile electronic display system according to the invention.

In FIG. 12 there is illustrated another apparatus for supporting a mobile electronic display system according to the invention, which is similar to the apparatus 1 of FIGS. 1 to 9, and similar elements in FIG. 12 are assigned the same reference numerals.

In this case the rear support frame part 14 provides a display holder for holding the display element 11 at the rear of the wearer. The front support frame part 13 provides the power source holder for holding the power source 12 at the front of the wearer.

Figure 13:
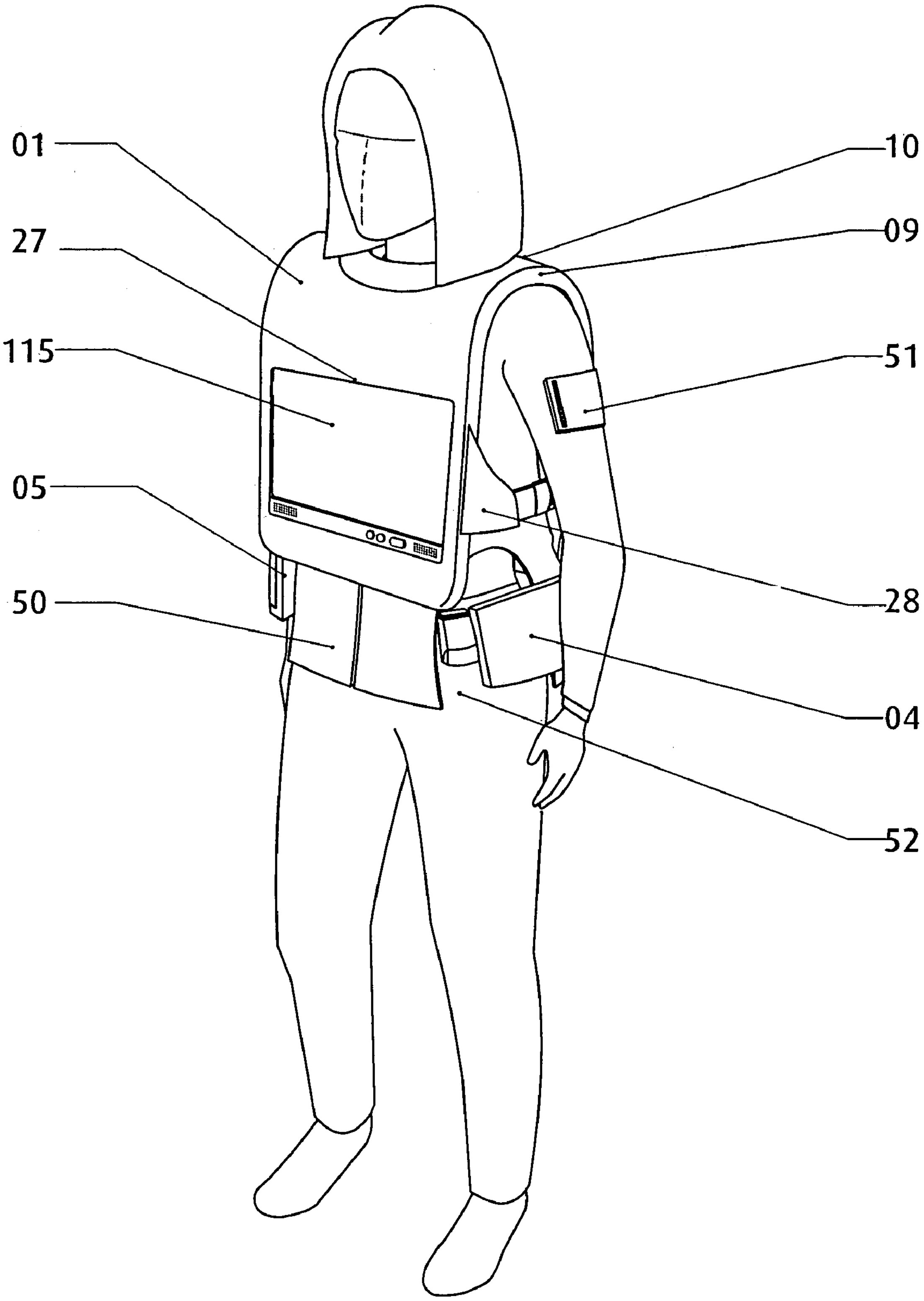
FIG. 13 is a view similar to FIG. 8(*e*) of the apparatus of FIG. 1 supporting a tablet personal computer.

It will be appreciated that the apparatus of the invention may be employed to support a variety of possible display elements. For example, as illustrated in FIG. 13, the apparatus 1, as described previously with reference to FIGS. 1 to 9, may be used to support a tablet personal computer 115 in place of the daylight-viewable electronic screen 11.

Figure 14:
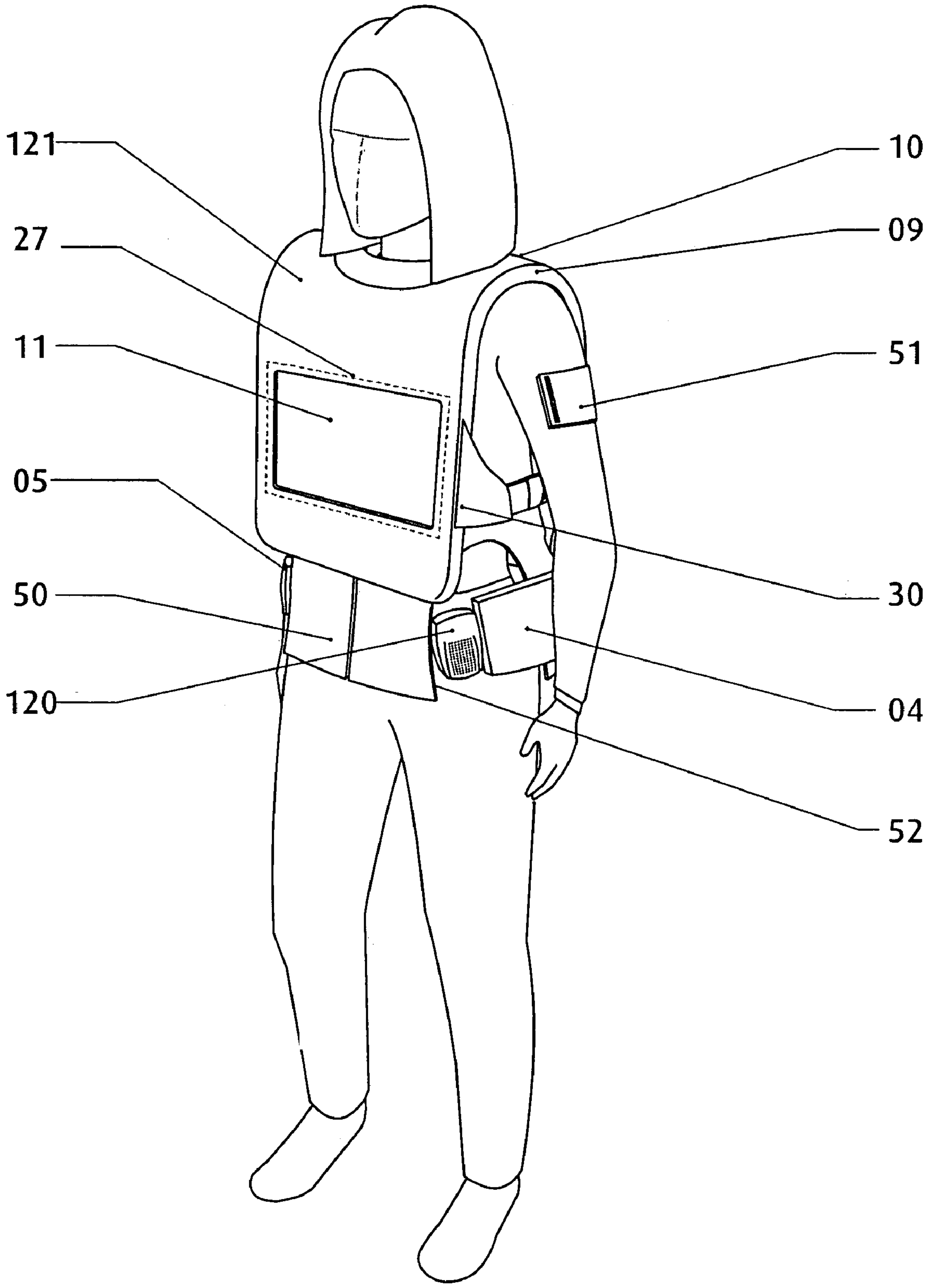
FIG. 14 is a view similar to FIG. 8(*e*) of another apparatus for supporting a mobile electronic display system according to the invention.

FIG. 14 illustrates another apparatus 121 for supporting a mobile electronic display system according to the invention, which is similar to the apparatus 1 of FIGS. 1 to 9, and similar elements in FIG. 14 are assigned the same reference numerals.

In this case the audio recording/transmitting device 120 is not provided as part of the apparatus 121. Instead the audio recording/transmitting device 120 is supported on the belt 40 worn by the person wearing the support frame 8.

Figure 15:
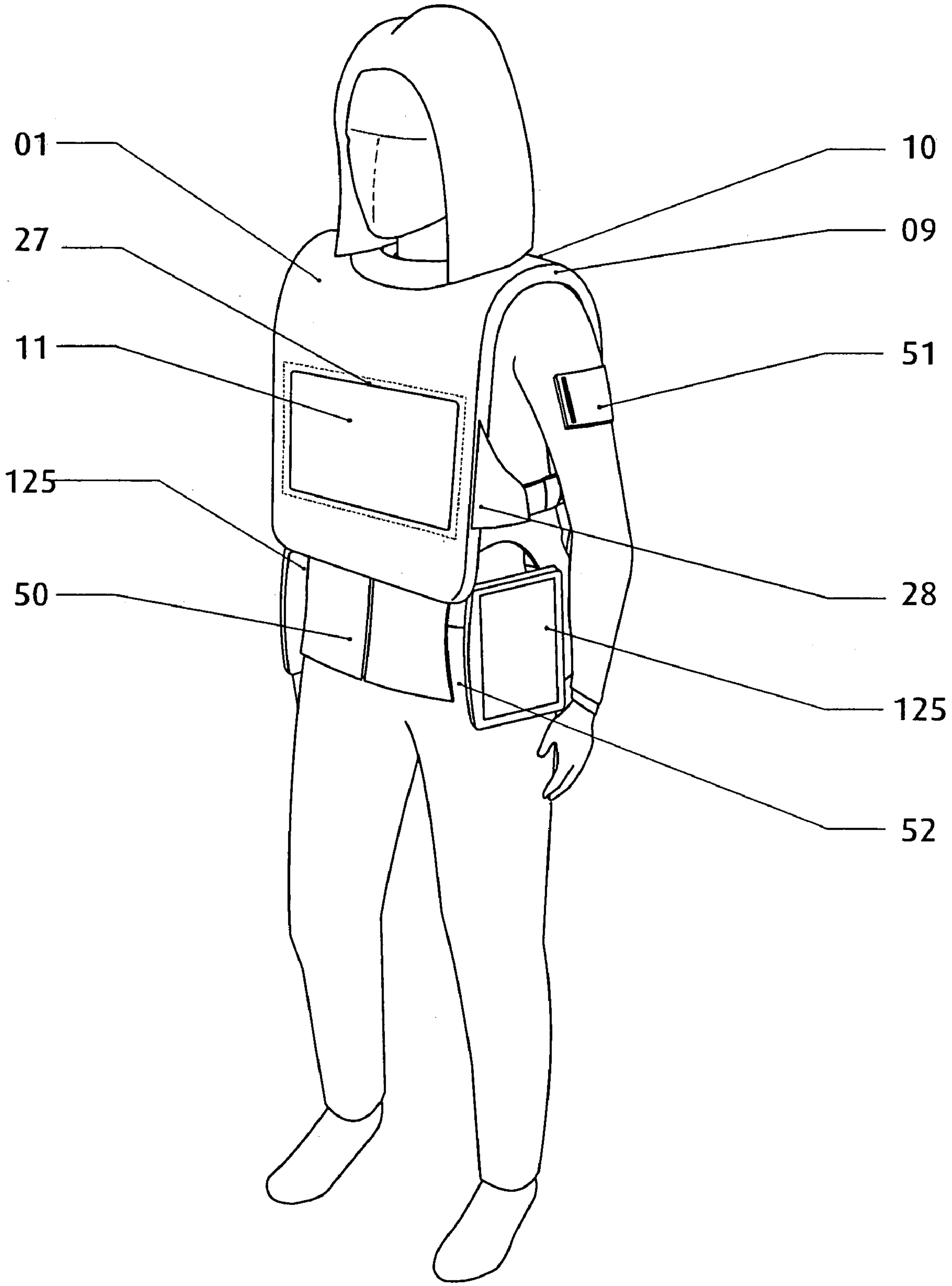
FIGS. 15 to 17 are further views similar to FIG. 8(*e*) of the apparatus of FIG. 1.

It will be appreciated that a variety of possible user interface means may be employed for information input/output between a user and the wearable computer 4. For example, two touch screens 125 may be employed for information input/output between a user and the wearable computer 4 (FIG. 15). The touch screens 125 may conveniently be supported on the belt 40 leaving the hands of the person wearing the apparatus 1 free.

Figure 16:
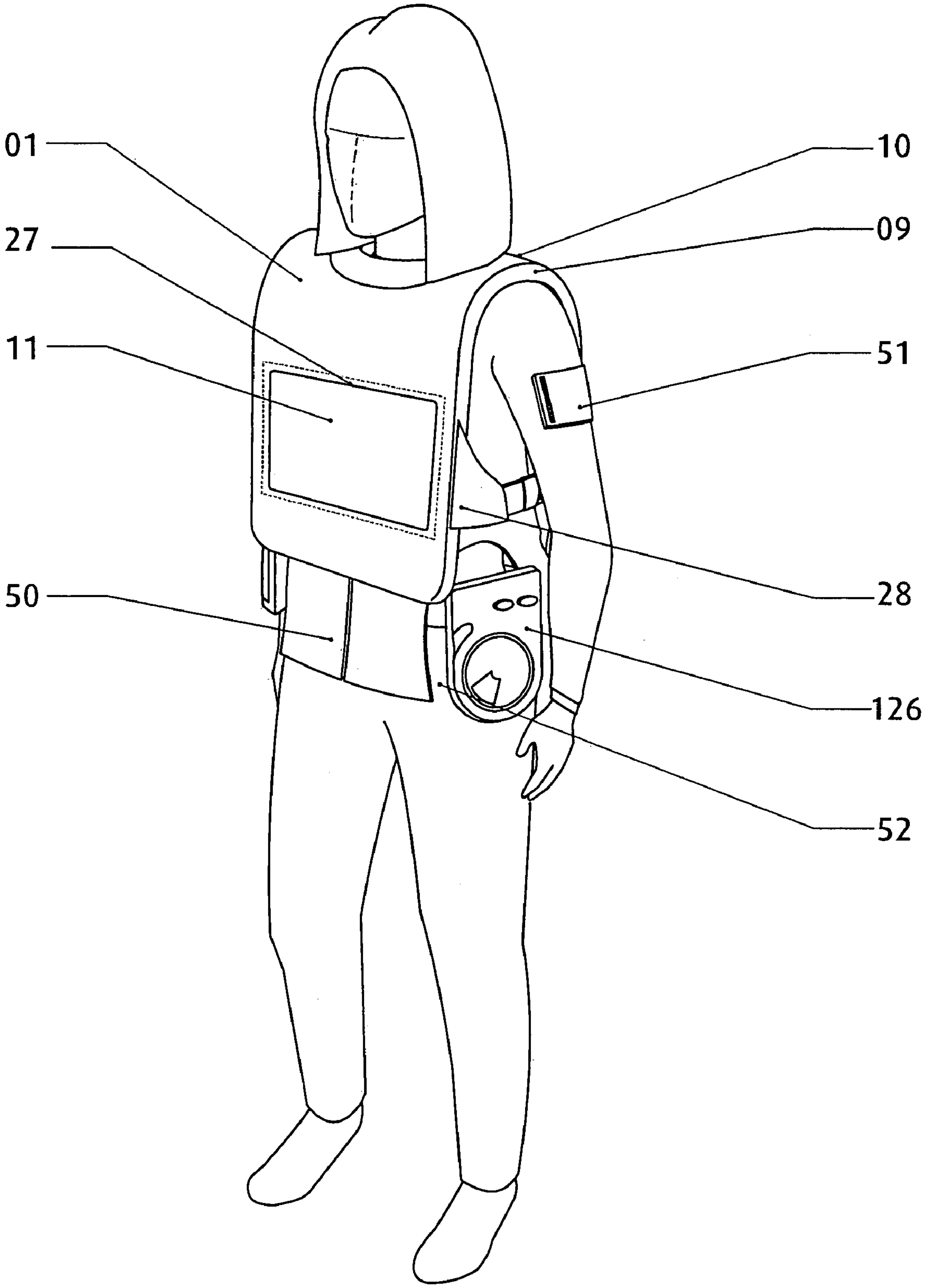

Furthermore it will be appreciated that the display element 11 is suitable for displaying visual images from a source other than the wearable computer 4. For example, the display element 11 may display visual images under the direct control of an external DVD player 126 connected to the display element 11, without a wearable computer being required (FIG. 16). This may result in a lighter and more compact kit for the person to wear. The DVD player 126 may be supported on the belt 40.

Figure 17:
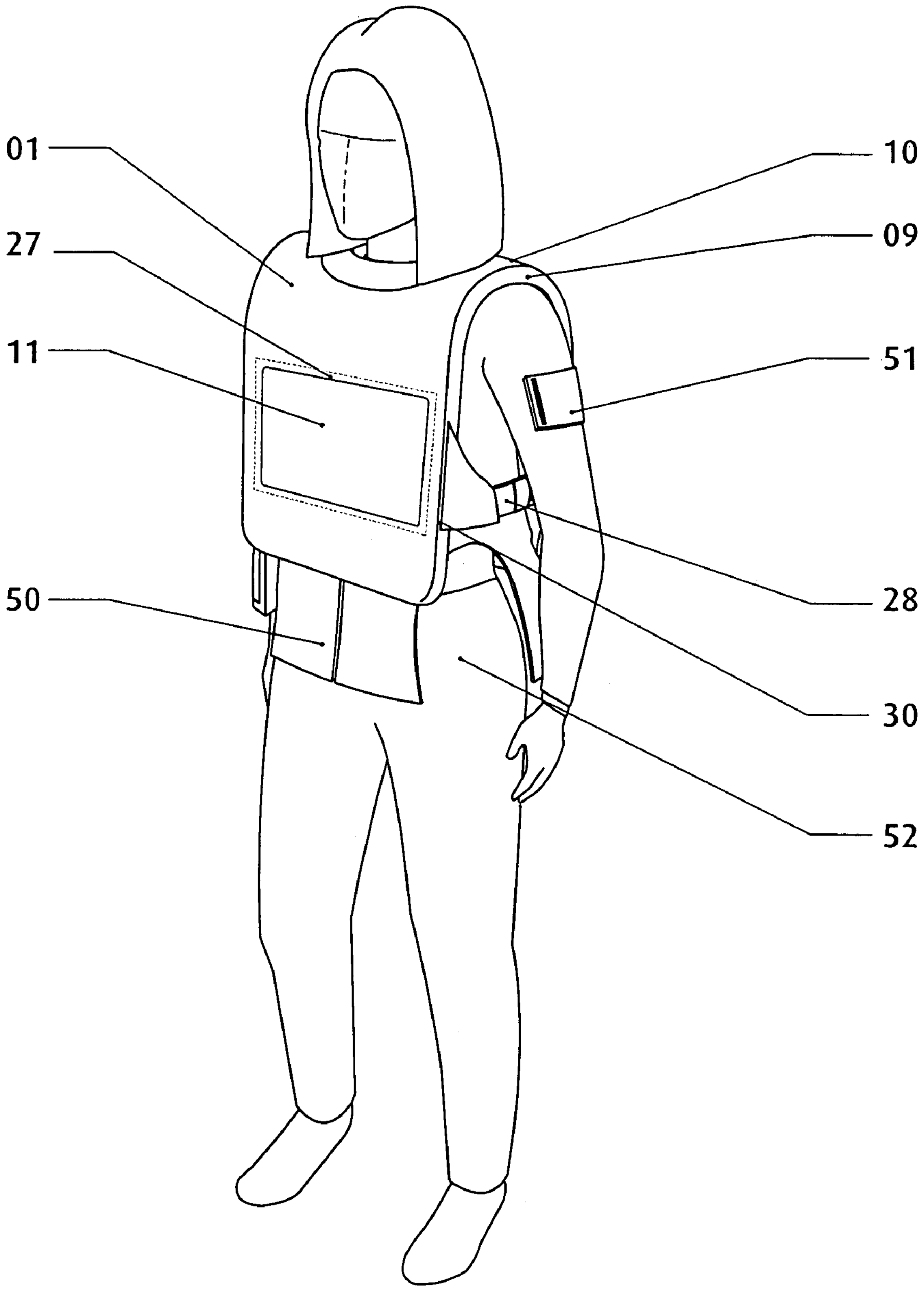

The source of the visual images may be housed within the support frame 8 beneath the cover 10, and connected directly to the display element 11. In such a case, no wearable computer may be required, and no user interface means may be required, as illustrated in FIG. 17. This arrangement further reduces the overall weight and bulk which the person wearing the apparatus 1 is required to wear.

Figure 18:
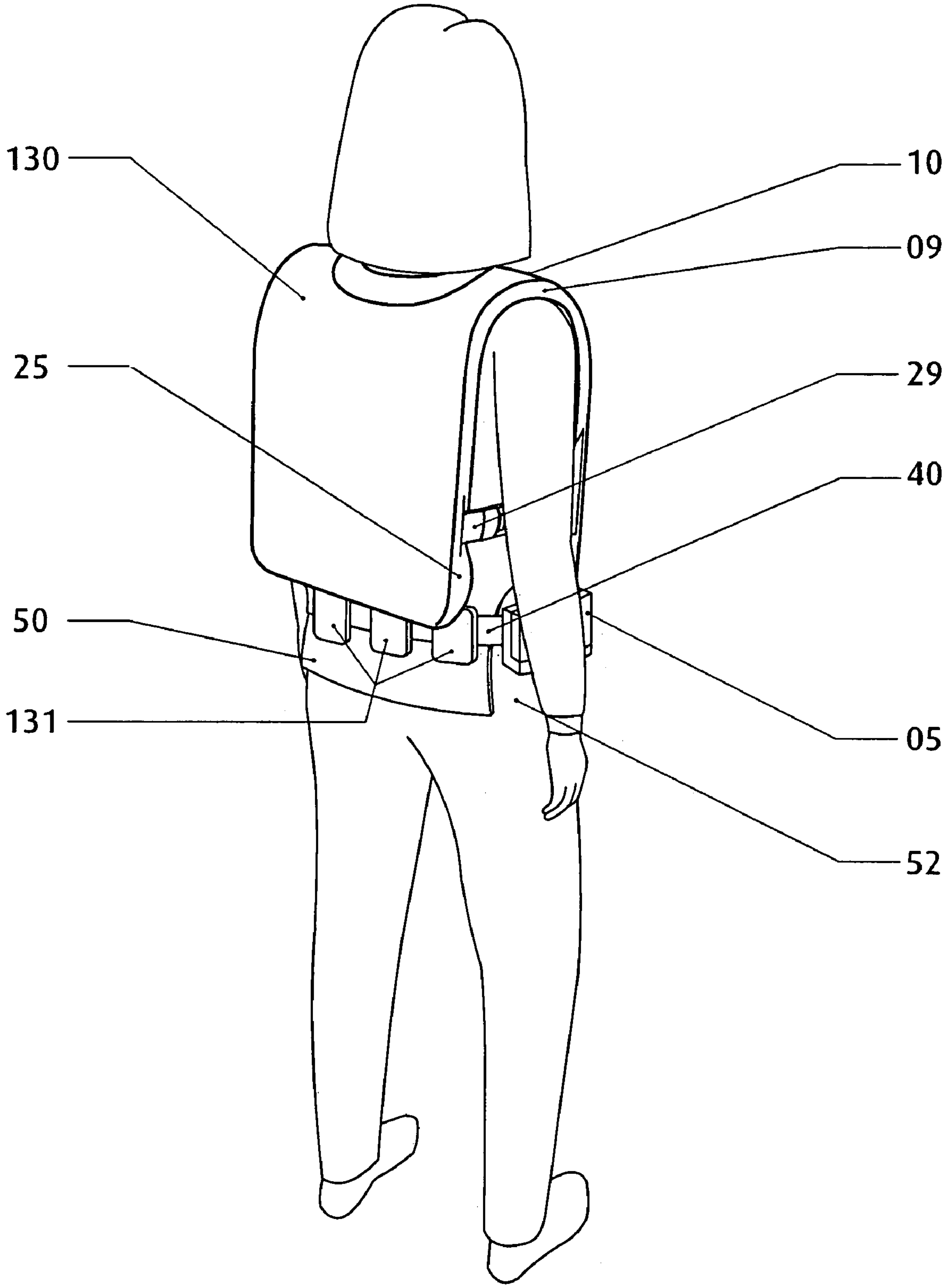
FIG. 18 is a view similar to FIG. 8(*f*) of another apparatus for supporting a mobile electronic display system according to the invention.

Referring to FIG. 18 there is illustrated another apparatus 130 for supporting a mobile electronic display system according to the invention, which is similar to the apparatus 1 of FIGS. 1 to 9, and similar elements in FIG. 18 are assigned the same reference numerals.

In this case, the rear support frame part 14 does not hold the power source. Instead the power source is provided by a series of batteries 132 supported on the belt 40.

Figure 19:
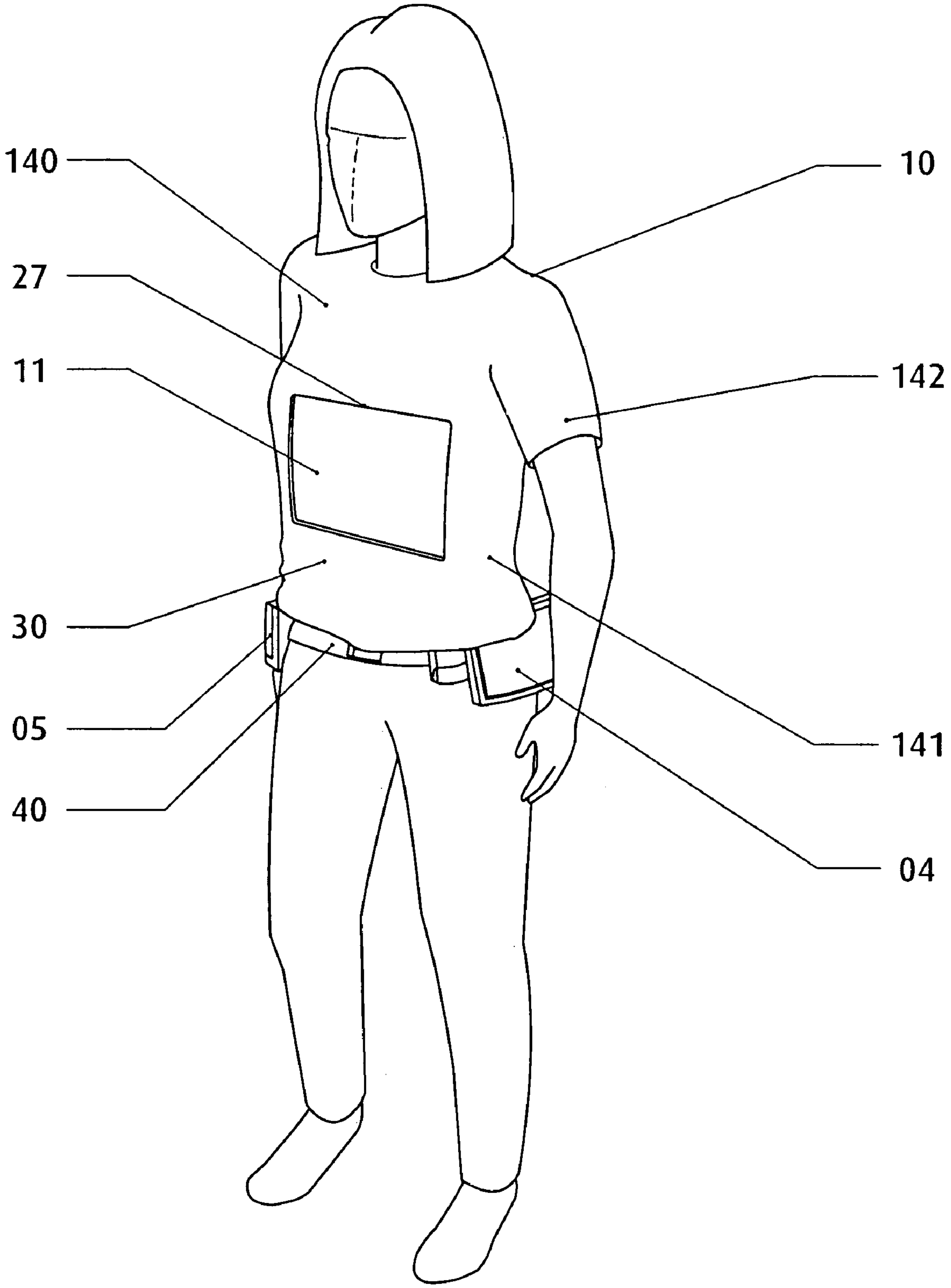
FIG. 19 is a view similar to FIG. 8(*a*) of a further apparatus for supporting a mobile electronic display system according to the invention.

In FIG. 19 there is illustrated a further apparatus 140 for supporting a mobile electronic display system according to the invention, which is similar to the apparatus 1 of FIGS. 1 to 9, and similar elements in FIG. 19 are assigned the same reference numerals.

In this case the apparatus 140 has the configuration of a T-shirt. In particular the cover 10 has side pieces 141, and T-shirt sleeve pieces 142 extend from the shoulders. Straps are provided between the front part 30 and the rear part 31 beneath the side pieces 141. This arrangement may result in a more comfortable to wear, and aesthetically pleasing apparatus 140.

Figure 20:
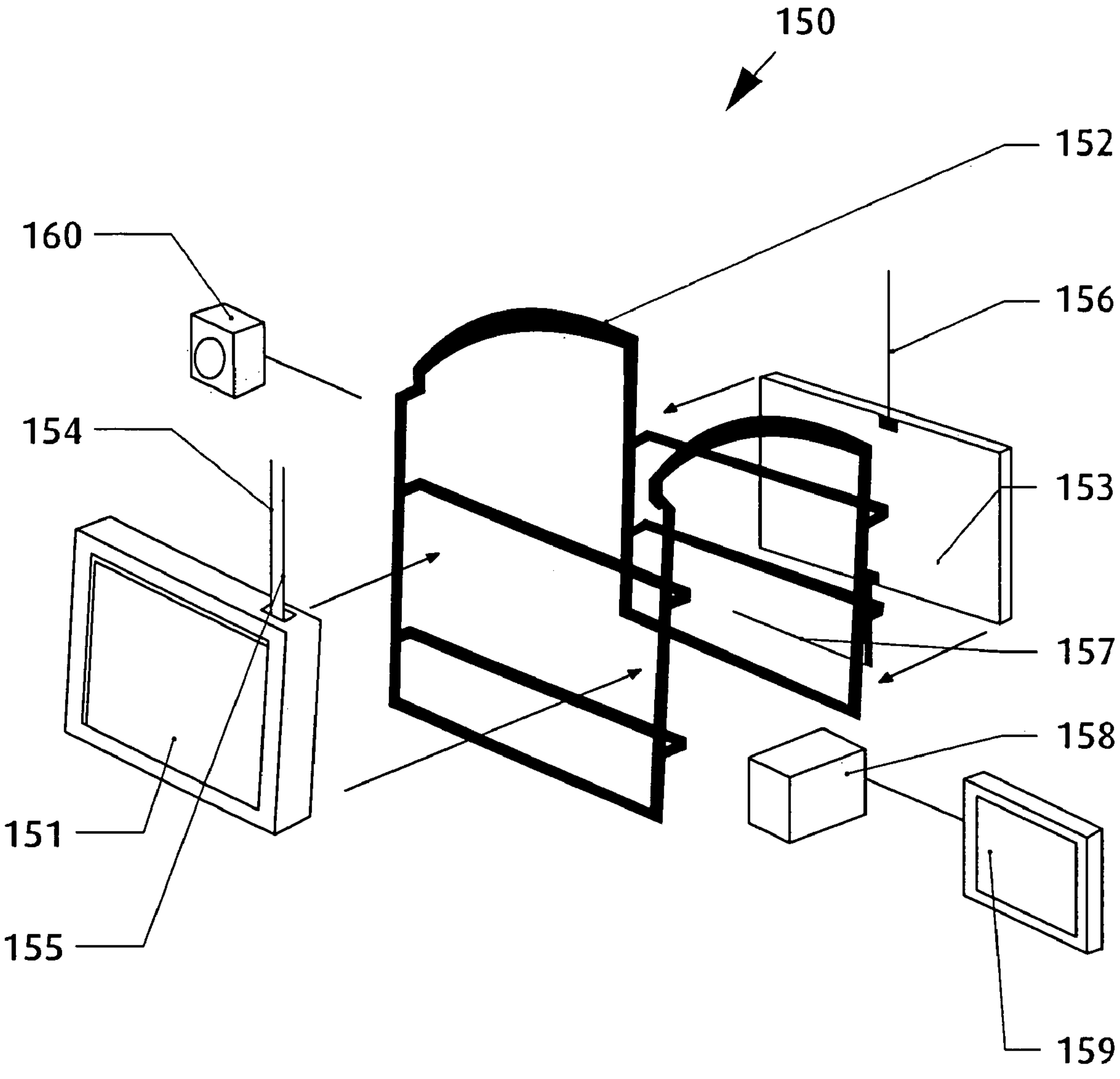
FIG. 20 is a perspective view of another apparatus for supporting a mobile electronic display system according to the invention.
Figure 21:
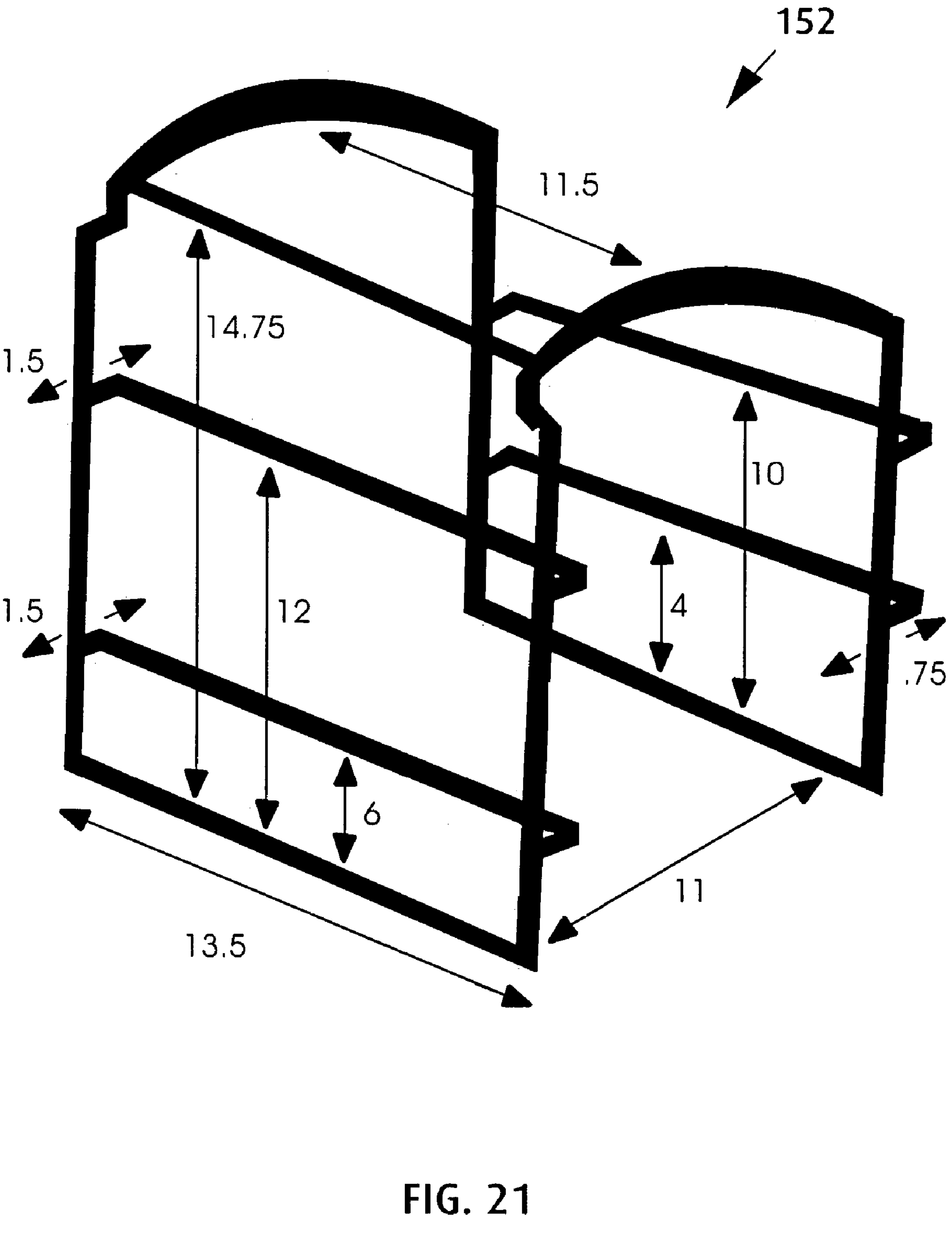
FIG. 21 is another perspective view of the apparatus of FIG. 20.

In FIGS. 20 and 21 there is illustrated another apparatus 150 for supporting a mobile electronic display system according to the invention.

In this case the apparatus 150 comprises a support frame chassis 152 for allowing the apparatus 150 to be "worn" by a user.

The mobile electronic display system comprises a flat-panel display screen 151;

- a battery 153 at the rear of the support frame 152;
- a power lead 154, and a VGA lead 155;
- a high power connector 156 and a low power connector 157;
- a controller 158, in this case a Windows™ based P.C.;
- a touch screen 159; and
- an IP camera 160.

The chassis 152 is shown in more detail in FIG. 21. The arrangement of cross bars allows versatility in location of parts of the apparatus 150, such as peripherals. The screen 151 is supported in a manner that allows assisted air flow behind it for cooling via vent holes. The controller 158 may be supported at the back or at the front of the support frame chassis 152. In one embodiment the screen 151 doubles as a keyboard when it tilts down to a horizontal position. The chassis 152 may support an antenna for wireless communication at the back.

Suitable dimensions in inches for the support frame chassis 152 are indicated in FIG. 2.

The invention provides a body worn advertising device for delivering high resolution content via a screen, especially relating to media campaigns. The device may comprise an aluminum chassis having a fabric outer garment housing a wearable PC, high output batteries, a touch screen for copy transference and user input, a direct thermal printer for customized on-demand couponing, internal speakers for audio playback and vouchers and wireless connectivity for point-of-sale.

This invention relates to the delivery of media and advertising campaigns using a body worn device which may consist of a wearable PC, a daylight viewable screen, wireless connectivity, a printer, sound playback and a touch screen input device for consumer interaction and point-of-sale. The device is an ergonomically designed aluminum chassis housing a screen in the front, batteries for operation in a sub chassis and lumbar support on the inside rear. The outer cover of the device is constructed of a water resistant, breathable material with pockets on the front inside for storage, a pocket on the rear for battery access and straps on the sides to enhance lateral lumbar support for the operator. The touch screen is tethered to the wearable PC by a communications cable and is housed in an outer cover constructed of the same material used in the outer garment. The thermal printer is also housed in this outer cover, and tethered to the wearable PC communications port via a mini USB cable. This thermal printer has an inbuilt credit card scanner and transmits swipeable details from a three-track scanner back to the wearable PC for processing via the mini USB cable also.

Advantages of the device of the invention include the interactivity of the system, the daylight and lowlight visibility of the screen, the ergonomic and lumbar support of the frame, the customized printing capabilities, the user input mechanisms, the instant copy transference, the point-of-sale capabilities, the wireless connectivity, the third party integration through industry standard web based protocols, the possibility of data encryption, seamless content delivery over a wireless network, remote content updates, the possibility of unique digital copy changes by the operator based on location, time or surrounding events, broadcast quality audio and visual delivery.

The invention provides a body worn device which may comprise media related content delivery through a daylight viewable screen held in a rigid chassis, with in-built audio on-board, pre-assembled and covered in a waterproof and breathable material cover, incorporating a wearable PC, a touchscreen for user input and copy transference, a direct thermal printer and credit card scanning device and internal batteries for standalone operation.

The wearable device elements may be a combination of soft elements and rigid elements. The elements may be selectively removable.

The screen, battery and cable runs and lumbar elements may be fixed to the internal chassis. Ideally the chassis is ergonomically designed for the largest percentile of operators.

The outer cover may be waterproof, breathable and easily removed from the chassis for cleaning and maintenance.

The daylight viewable screen may be an LCD and have a minimum output of 1000 nits of brightness.

The PC may be a mobile wearable device capable of storing digital content and transacting processing requests from the touch screen, the thermal printer and the credit card swipe.

The device may be able to play audio through an internal speaker housed inside the chassis.

The device may be powered by internal batteries.

The device may be able to deliver point-of-sale applications.

The operator may be able to change copy locally.

The garment cover may be machine washable up to 40 degrees.

The outer cover may be treated with a water proofing coating.

The device may be constructed of light weight aluminum including synthetic fibers selected from foam, nylon and combinations thereof.

The external lumbar support may comprise a 'D' shaped high density foam profile located on the rear bottom inside of the chassis. Adjustable straps are incorporated into the side of the outer cover, which when clipped together, force the foam profile to sit into the curvature of the base of an operator's spine. In this way the lumbar supports the carrying device.

The subchassis incorporates a hinge mechanism, which may be accessed from the rear through a pocket formed in the outer cover, and can be opened while the pack is being worn. This allows for a quick and easy change over of the battery without device removal being required.

A small opening may be incorporated into the outer cover to allow for access to the battery LED power indicator. Again, this can be accessed while the pack is being worn by an operator.

The subchassis has room to hold two batteries at the one time, both of which can be changed when the pack is being worn by an operator.

A pre-amp and mono speaker are provided with the internal chassis that contains the LCD screen. This allows for audio playback on media campaigns.

The outer cover material has been selected to conform to a number of criteria: to be 'breathable' to allow for adequate ventilation to components, to be non-specialist washable to allow for easy maintenance, to be water resistant to provide adequate protection for components, to be scratch and scuff resistant.

Pockets are incorporated on the front inside of the outer garment to allow the operators to place their hands inside.

The apparatus 1 enables the display of advertising content on the screen 11 in a manner controlled by the wearable computer 4. This content may be selected by the wearer to be the most appropriate for the particular location. Thus the apparatus achieves the visual impact of television and electronic display signs, the precision of direct marketing, the accessibility of press and radio, and interactivity.

The invention is not limited to the embodiments hereinbefore described, with reference to the accompanying drawings, which may be varied in construction and detail.

The invention claimed is:

1. An apparatus for supporting a mobile electronic display system, the apparatus comprising:

a support frame suitable for being worn by a person to support the mobile electronic display system;

the support frame comprising a front support frame part configured to be located at the front of the person wearing the support frame, and a rear support frame part configured to be located at the rear of the person wearing the support frame;

wherein the support frame comprises a power source holder for holding a power source of the mobile electronic display system;

wherein the power source holder is configured to releasably hold the power source; and wherein the power source holder comprises a first holder part movably coupled to a second holder part.

2. The apparatus as claimed in claim 1 wherein the front support frame part is configured to extend substantially across a chest of the person wearing the support frame.

3. The apparatus as claimed in claim 1 wherein the rear support frame part is configured to extend substantially across a back of the person wearing the support frame.

4. The apparatus as claimed in claim 1 wherein the front and/or rear support frame part is configured to be located below a head of the person wearing the support frame.

5. The apparatus as claimed in claim 1 wherein the support frame comprises at least one bearing member configured to extend over a shoulder of the person wearing the support frame between the front support frame part and the rear support frame part.

6. The apparatus as claimed in claim 5 wherein the support frame comprises a first bearing member configured to extend over a first shoulder and a second bearing member configured to extend over a second shoulder of the person wearing the support frame.

7. The apparatus as claimed in claim 5 wherein the front support frame part and the rear support frame part are supported by the at least one bearing member.

8. The apparatus as claimed in claim 7 wherein the front support frame part and the rear support frame part hang from the at least one bearing member.

9. The apparatus as claimed in claim 5 wherein the support frame is substantially "U"-shaped in side-view.

10. The apparatus as claimed in claim 1 wherein the front support frame part is substantially fixed relative to the rear support frame part.

11. The apparatus as claimed in claim 10 wherein the support frame is substantially rigid.

12. The apparatus as claimed in claim 1 wherein the support frame comprises a display holder for releasably holding a display element of the mobile electronic display system.

13. The apparatus as claimed in claim 12 wherein the display holder comprises a first holder part detachably coupled to a second holder part.

14. The apparatus as claimed in claim 13 wherein the display holder defines a reception space between the first holder part and the second holder part for removably receiving the display element.

15. The apparatus as claimed in claim 12 wherein the display holder comprises a window for displaying the display element held in the display holder.

16. The apparatus as claimed in claim 15 wherein the window is configured to face substantially away from the person wearing the support frame.

17. The apparatus as claimed in claim 12 wherein the front support frame part comprises the display holder.

18. The apparatus as claimed in claim 1 wherein the first holder part is movable relative to the second holder part between a holding configuration and a replacing configuration.

19. The apparatus as claimed in claim 18 wherein the first holder part is hingeable relative to the second holder part between the holding configuration and the replacing configuration.

20. The apparatus as claimed in claim 18 wherein in the holding configuration the power source holder defines a reception space between the first holder part and the second holder part for removably receiving the power source.

21. The apparatus as claimed in claim 1 wherein the rear support frame part comprises the power source holder.

22. The apparatus as claimed in claim 1 wherein the apparatus comprises a support element protruding from the support frame inwardly towards the person wearing the support frame to engage against the person.

23. The apparatus as claimed in claim 22 wherein the support element is supported by the rear support frame part.

24. The apparatus as claimed in claim 23 wherein the support element is configured to engage against the lower spine of the person wearing the support frame.

25. The apparatus as claimed in claim 24 wherein the support element comprises a lumbar support element.

26. The apparatus as claimed in claim 22 wherein the apparatus comprises at least one urging member to urge the support element into engagement against the person wearing the support frame.

27. The apparatus as claimed in claim 26 wherein the urging member comprises a tensionable member for pulling the support element into engagement against the person wearing the support frame.

28. The apparatus as claimed in claim 27 wherein the tensionable member extends between the front support frame part and the rear support frame part.

29. The apparatus as claimed in claim 28 wherein the tensionable member is configured to extend along a side of the person wearing the support frame.

30. The apparatus as claimed in claim 29 wherein the apparatus comprises a first tensionable member configured to extend along a first side and a second tensionable member configured to extend along a second side of the person wearing the support frame.

31. The apparatus as claimed in claim 27 wherein the tensionable member comprises a release element to facilitate release of tension in the tensionable member.

32. The apparatus as claimed in claim 1 wherein the apparatus comprises a cushion member extending over at least part of a surface of the support frame.

33. The apparatus as claimed in claim 32 wherein the cushion member comprises the support element.

34. The apparatus as claimed in claim 1 wherein the apparatus comprises a cover for the support frame.

35. The apparatus as claimed in claim 34 wherein the cover encloses the support frame.

36. The apparatus as claimed in claim 34 wherein the cover comprises one or more openings to facilitate access to one or more components of the mobile electronic display system beneath the cover.

37. The apparatus as claimed in claim 36 wherein the opening is selectively closeable.

38. The apparatus as claimed in claim 37 wherein the cover comprises a flap for extending over the opening to selectively close the opening.

39. The apparatus as claimed in claim 34 wherein the cover comprises one or more windows for displaying one or more components of the mobile electronic display system beneath the cover.

40. An apparatus for supporting a mobile electronic display system, the apparatus comprising:

a support frame suitable for being worn by a person to support the mobile electronic display system;

the support frame comprising a front support frame part configured to be located at the front of the person wearing the support frame, and a rear support frame part configured to be located at the rear of the person wearing the support frame;

wherein the support frame comprises a power source holder for holding a power source of the mobile electronic display system; and wherein the rear support frame part comprises the power source holder.

41. An apparatus for supporting a mobile electronic display system, the apparatus comprising:

a support frame suitable for being worn by a person to support the mobile electronic display system;

the support frame comprising a front support frame part configured to be located at the front of the person wearing the support frame, and a rear support frame part configured to be located at the rear of the person wearing the support frame;

wherein the apparatus comprises a support element protruding from the support frame inwardly towards the person wearing the support frame to engage against the person;

wherein the support element is supported by the rear support frame part; and wherein the support element is configured to engage against the lower spine of the person wearing the support frame.

42. An apparatus for supporting a mobile electronic display system, the apparatus comprising:

a support frame suitable for being worn by a person to support the mobile electronic display system;

the support frame comprising a front support frame part configured to be located at the front of the person wearing the support frame, and a rear support frame part configured to be located at the rear of the person wearing the support frame;

wherein the apparatus comprises a cover for the support frame; and wherein the cover comprises one or more windows for displaying one or more components of the mobile electronic display system beneath the cover.

* * * * *